(12) United States Patent
Poulsen

(10) Patent No.: US 7,548,369 B2
(45) Date of Patent: Jun. 16, 2009

(54) PROJECTION-RECEIVING SURFACE COMPRISING A SINGLE SHEET FORMED INTO A PLURALITY OF CATENOID-LIKE MIRRORLETTES

(75) Inventor: Peter D. Poulsen, Grants Pass, OR (US)

(73) Assignee: Merlin Technology Limited Liability Company, Grants Pass, OR (US)

( * ) Notice: Subject to any disclaimer, the term of this patent is extended or adjusted under 35 U.S.C. 154(b) by 0 days.

(21) Appl. No.: 11/740,059

(22) Filed: Apr. 25, 2007

(65) Prior Publication Data
US 2007/0195407 A1    Aug. 23, 2007

Related U.S. Application Data

(63) Continuation of application No. 10/961,834, filed on Oct. 7, 2004, now Pat. No. 7,239,445.

(60) Provisional application No. 60/509,973, filed on Oct. 9, 2003.

(51) Int. Cl.
*G03B 21/60* (2006.01)
*G03B 21/56* (2006.01)
(52) U.S. Cl. ............... 359/455; 359/459; 359/449
(58) Field of Classification Search ............. 359/459, 359/449, 455, 359, 443
See application file for complete search history.

(56) References Cited

U.S. PATENT DOCUMENTS

| | | | |
|---|---|---|---|
| 1,279,262 A * | 9/1918 | Clark | .......... 359/459 |
| 1,535,985 A | 4/1925 | Clark | |
| 1,550,880 A | 8/1925 | Clark | |
| 2,381,614 A | 8/1945 | Moller et al. | |
| 2,552,455 A * | 5/1951 | Pond | .......... 359/459 |
| 3,087,375 A | 4/1963 | Papke | |
| 3,263,561 A | 8/1966 | Jackson | |
| 3,502,389 A | 3/1970 | Hilborn | |
| 3,622,223 A | 11/1971 | Brakell | |
| 3,712,708 A | 1/1973 | Brown | |

(Continued)

FOREIGN PATENT DOCUMENTS

EP     1091342 A2     4/2001

(Continued)

OTHER PUBLICATIONS

PCT International Search Report, PCT/US04/33485, Oct. 19, 2006 (3 pages).

(Continued)

*Primary Examiner*—Diane I Lee
*Assistant Examiner*—Magda Cruz
(74) *Attorney, Agent, or Firm*—Conley Rose, P.C.; Kristin Jordan Harkins

(57) ABSTRACT

The present invention is a broadband projection-receiving surface that can function as a projection screen. This surface can, even in strong ambient light, provide high gain, prevent glare and speckle, provide high contrast, preserve of gray-scale linearity, provide a uniformity of brightness, provide rapid angular cut-off, preserve polarization, and provide the ability to function over a large spectral range. These achievements result from a production method that utilizes purposeful partitioning of the material processes used in sub-wavelength morphology (finish) from the processes used to make super-wavelength morphology (figure).

26 Claims, 14 Drawing Sheets

U.S. PATENT DOCUMENTS

| | | | |
|---|---|---|---|
| 3,994,562 A | 11/1976 | Holzel | |
| 4,006,965 A | 2/1977 | Takada et al. | |
| 4,022,522 A | 5/1977 | Rain | |
| 4,025,160 A | 5/1977 | Martinez | |
| 4,040,717 A | 8/1977 | Cinque et al. | |
| 4,068,922 A | 1/1978 | Dotsko | |
| 4,089,587 A | 5/1978 | Schudel | |
| 4,190,320 A | 2/1980 | Ferro | |
| 4,191,451 A | 3/1980 | Hodges | |
| 4,206,969 A | 6/1980 | Cobb et al. | |
| 4,235,513 A | 11/1980 | Vlahos | |
| 4,297,001 A | 10/1981 | Antes et al. | |
| 4,298,246 A | 11/1981 | Iwamura | |
| 4,338,165 A * | 7/1982 | Vlahos | 156/64 |
| 4,458,251 A | 7/1984 | Bondon | |
| 4,606,609 A | 8/1986 | Hong | |
| 4,767,186 A | 8/1988 | Bradley, Jr. et al. | |
| 4,911,529 A | 3/1990 | Van De Ven | |
| 5,112,121 A | 5/1992 | Chang et al. | |
| 5,210,641 A | 5/1993 | Lewis | |
| 5,296,965 A | 3/1994 | Uetsuki et al. | |
| 5,335,022 A | 8/1994 | Braun et al. | |
| 5,541,769 A | 7/1996 | Ansley et al. | |
| 5,581,605 A | 12/1996 | Murakami et al. | |
| 5,625,489 A | 4/1997 | Glenn | |
| 5,774,174 A * | 6/1998 | Hardie | 348/38 |
| 6,040,941 A | 3/2000 | Miwa et al. | |
| 6,081,380 A | 6/2000 | Ohshima et al. | |
| 6,212,011 B1 | 4/2001 | Lissotschenko et al. | |
| 6,252,216 B1 | 6/2001 | Ohashi | |
| 6,381,071 B1 | 4/2002 | Dona et al. | |
| 6,384,970 B1 | 5/2002 | Abe et al. | |
| 6,411,439 B2 | 6/2002 | Nishikawa | |
| 6,570,706 B2 | 5/2003 | Atchison et al. | |
| 6,873,384 B2 | 3/2005 | Yamanaka et al. | |
| 6,914,725 B2 | 7/2005 | Fujita | |
| 6,932,476 B2 | 8/2005 | Sudo et al. | |
| 6,940,653 B2 | 9/2005 | Favalora et al. | |
| 6,995,917 B1 * | 2/2006 | Sampsell et al. | 359/634 |
| 7,180,663 B2 | 2/2007 | Collender et al. | |
| 7,239,445 B2 * | 7/2007 | Pouslen | 359/459 |

FOREIGN PATENT DOCUMENTS

| | | |
|---|---|---|
| WO | WO 93/15585 | 8/1993 |

OTHER PUBLICATIONS

PCT Written Opinion, PCT/US04/33485, Oct. 19, 2006 (3 pages).
PCT International Preliminary Report on Patentability, PCT/US04/33485, Nov. 21, 2006 (4 pages).
Office Action dated Dec. 26, 2008, Chinese Patent Application No. 200480033952.8 (4 pages).
Supplemental Research Report dated Jan. 27, 2009, European Patent Application No. 04794755.1 (3 pages).

* cited by examiner

PROJECTION-RECEIVING SURFACE COMPRISING A SINGLE SHEET FORMED INTO A PLURALITY OF CATENOID-LIKE MIRRORLETTES

CROSS-REFERENCE TO RELATED APPLICATIONS

This is a continuation application of co-pending U.S. patent application Ser. No. 10/961,834 filed Oct. 7, 2004 and entitled "Projection-Receiving Surface That Functions in Ambient Light", which claims the benefit under U.S.C. § 119(e) of U.S. Provisional Application No. 60/509,973 filed on Oct. 9, 2003 and entitled "Projection Screen That Functions in Strong Ambient Light", both hereby incorporated herein by reference for all purposes.

STATEMENT REGARDING FEDERALLY SPONSORED RESEARCH OR DEVELOPMENT

Not Applicable.

BACKGROUND

1. Field of Invention

This invention relates generally to projection-receiving surfaces and methods of making same, and more particularly to broadband projection screens that facilitate high contrast in strong ambient light and that supports multiple simultaneous images.

2. Related Art

Projection screens do not perform well in conditions of strong ambient light. The screen-image viewed by observers differs significantly from the original projection image. The measures of poor replication of a projected image, as it is experienced in the associated viewed image, can be any one of, or combination of, objective, quantifiable metric factors. Many of the metrics of quality for an image projected onto a screen are seriously degraded even when ordinary room lighting illuminates a projection screen. The incidence of direct sunlight on a screen typically destroys in totality every metric of the image's quality. Prior art has attempted to overcome the degradation of projection screen metrics, but the complex problem of maintaining high quality under severe environmental lighting conditions has until now eluded solution. Although an art may preserve one or several of the metrics of image quality, each prior art fails, in strong ambient light, to provide preservation of the complete array of metric levels characteristic of high quality imagery.

The challenges for prior art of any genre to realize good levels for all of the image metrics when a screen is used in strong ambient light will be reviewed below. The review will set a framework for understanding the objects, uniqueness, and non-obviousness of the present invention.

With regard to prior art, it is important to bear in mind throughout this review that, although prior art screens have been successful in attaining suitable levels in one or more of the performance metrics, no single prior art screen has been successful in attaining all the metrics at the same time when exposed to strong ambient light. In this review, only a limited number of examples can be included from applicable prior art genre to illustrate each genre's ability to attain needed levels in each metric. The examples are not intended to be exhaustive in specifics. Rather, they are intended to be inclusively representative of the genre to which they correspond and to provide a vehicle for understanding the intricacies of the metrics individually and interactively.

The array of metrics includes more than mere consideration of screen image brightness. Indeed, once image brightness exceeds visual threshold, preferably obtained using an efficient reflector screen, the quality of a projected image as it appears on the screen is governed by prevention of glare and speckle, by maintenance of contrast of the image being projected, by conservation of gray scale linearity, by maintenance of image brightness uniformity, by fidelity in reproduction of color hue and color saturation, and by preservation of the original projection image's resolution. Additionally, the avoidance of Moire patterns, the minimization of depolarization, and achievement of broadband performance have significant value in a high performance screen.

Genre of Prior Art. The aforementioned requirements for obtaining quality projected imagery in high ambient light will be reviewed with respect to prior art by roughly dividing prior art into three genre: Traditional unitary-gain diffuse scattering screens, Diffraction-based screens, and Enhanced-gain screens with either catadioptric architectures (combines reflection and refraction) or completely reflective morphologies.

Traditional unitary-gain projection screens produce a viewing volume (region wherein observers satisfactorily see the image light on the screen) that includes the entire hemisphere in front of the screen. This is achieved by way of light diffusion, light scatter, or a combination of both. The finish (surface roughness) of the screen, not the figure (shape) of the screen governs the reflection's angular profile. A significant and relatively constant percentage of the reflected image is seen in every direction. The theoretical screen with such a brightness profile is the Lambertian screen, which scatters the collective of the image light isotropically into the front hemisphere. Paint, powders, papers, plastics and crinkled metal are typical screen surfaces that loosely approximate the Lambertian performance. As will be understood from discussion below, unitary-gain screens are not amenable to operation in strong ambient light.

Diffraction-based screens use the phenomenon of light wave interference to produce the screen itself, or to cause the preferred constructive reflection of the light into a viewing volume, with or without the gain described below. For many reasons diffraction-based screens are poor candidates for operation in strong ambient light.

Enhanced-gain projection screens deliver a greater brightness to some viewer locations than unitary-gain screens deliver to the same locations. This is the result of redirecting light from one part of the Lambertian volume so that it adds to another part. In effect, a notable portion of the projection light is redirected (dispersed) under the influence of the figure (shape) of projection screen surface components. Catadioptric screen systems achieve enhanced gain, shown as 8 in FIG. 1, using a refractive process and a reflective process. First, incoming projection light impinges on a refractive layer (lens array, optical beads, prisms, etc.) that deviates the path of the light. The light then continues on to a second layer. That layer reflects the light back out through the refractive layer, from which the light exits into a smaller viewing volume than with a Lambertian screen. (Other catadioptric screen systems have varying details, but operate on a similar concept.) Later discussion will disclose the shortcomings of catadioptric screens for obtaining quality mages in strong ambient light. Much of the problem can result from residual diffusion areas, though inability to obtain desired reflection-element figure for controlled dispersion can be a factor also.

Enhanced-gain projection screens using purely reflective morphologies have a front-surface array of small dispersion cells on the screen that reflects the projection light into a reduced viewing volume by way of an array of mirrorlettes having pre-selected curvatures or slopes on the continuous reflective surface itself, or by orientation of individual reflectors dispersed within a medium at the screen where the purpose of the medium is to hold the reflectors, not to refractively redirect the light as with catadioptric screen systems. Prior art using reflective morphologies have offered the best route for operation in strong ambient light. No reflective-morphology prior art has preserved high enough performance in all the metrics needed for maintenance of quality imagery under such conditions, however. This is so even though the diffuse scatter has been reduced to a fraction of the dispersed (redirected) light; it just cannot be reduced enough with prior art to solve the problem of strong ambient light.

The foregoing review of the three genre for prior art is by no means exhaustive of details, nor are the demarcation parameters used for placement of specific prior art examples into each genre definitive or absolute. Still, the foregoing review provides a fair and complete representation of the concepts used throughout the realm of prior art.

From this review, prior art's shortcomings for creation of high-contrast images in strong-light environments can be discussed. This discussion now will be undertaken relative to the earlier mentioned metrics, namely: efficiency in production of bright images, prevention of glare and speckle, maintenance of contrast of the image being projected, conservation of gray scale linearity, maintenance of image brightness uniformity, fidelity in reproduction of color hue and color saturation, and preservation of the original image's resolution. To these will be added discussion of the previously mentioned need for avoidance of Moire patterns, minimization of depolarization, achievement of broadband performance, and realization of commercial viability.

Below is a discussion of the prior art vis-à-vis individual metrics.

Regarding efficient production of screen brightness using prior art: In any case wherein the viewers do not need to be distributed throughout the entire forward hemisphere of the screen, a unitary gain screen as illustrated in FIG. 1 curve 11, is not light efficient. An enhanced gain screen is more efficient, as shown by FIG. 1 curves 12 (dotted line curve), 14 (solid line curve) and 16 (dashed curve). It reflects more light power to viewer locations and less to the peripheral angles where viewers are confronted by unacceptable image distortion even if they did receive reflected light. Herein, gain 8 is defined as any increase above curve 11, as shown in FIG. 1. Gain generally is the ratio of screen brightness to Lambertian brightness for equivalent levels of projection light. Lens arrays such as U.S. Pat. No. 4,606,609 to Hong (1986), U.S. Pat. No. 4,767,186 to Bradley, Jr., et al. (1988), and U.S. Pat. No. 4,911,529 to Van De Ven (1990), along with various glass bead architectures, all as representative of catadioptric screen systems, as well as silver reticulated surfaces as representative of an enhanced gain reflective screen, are typified by FIG. 1 curves 12 and 14. Glass bead screens are the more common in the marketplace. They have various forms of backing material composition and morphology (shaping). Gains achievable with glass bead screens are restricted by intrinsic limits of spheres in allowing active area packing density. Gains with metric values approaching three can be achieved, although such gains are uncommon. Other catadioptric screens can demonstrate higher gains but generally not with the often-desired profile of FIG. 1 curve 16. As with glass bead screens, the other catadioptric screens are not suitable in additional regards, such as broadband spectral operation and maintenance of image darkness as needed to preserve high contrast ratios.

The dispersion of light is actually a three-dimensional issue, so the power efficiency of a screen can be much higher than the two-dimensional portrayals in FIG. 1 would suggest. In a two-dimensional portrayal the area under each dispersion curve is maintained constant to satisfy the principle of conservation of energy. In a three-dimensional portrayal, conservation of energy requires that the volume under each screen's dispersion surface be maintained. This can emphasize the differences in screen gain of FIG. 1. The additional dimension also has a major effect on the performance of a screen when deflecting strong environmental light away from the viewing volume.

Mirrorlettes, in theory, can yield much higher screen gains than catadioptric screens. Performance such as FIG. 1 curve 16 would be theoretically attainable only with mirrorlettes, and only if suitable manufacturing hurdles could be overcome, which have not currently been overcome. However, prior art attempts to make large mirrorlette arrays with the profiles of curve 16 have been unsuccessful because the basic concepts associated with proposed assemblies failed to account for the difficulties of making an array of even hundreds of thousands, let alone the needed millions, of very small, optical quality elements.

The requirements for individual mirrorlettes can be considered on two scales of dimension. One scale is associated with the overall size and curvature of the mirrorlette, which is often termed "figure." The outer dimensions of an individual mirrorlette figure are many times larger in size than the wavelength of the light it is designed to reflect. That is, the figure is the intended shape, controlled to tolerances that are allowed to be very much larger than a wavelength of light for which the mirrorlette is being designed. The figure of the mirrorlette surface within the outer dimensions of the mirrorlette is designed to produce the screen's desired light dispersion pattern, with the presumption that specular reflection can be achieved by the surface. A metric associated with screen mirrorlette figure is based on this assumption of a surface finish that produces perfect specularity. The fraction of light falling within the obtained mirrorlette shape relative to the desired distribution is the figure quality. It should be noted that this metric is not a measure of smoothness; it is a measure of a mirrorlette's ability to approach desired or theoretical distribution of the projector's light if a specular surface exists.

Specular reflection is to be understood here as that component of reflected light that lies along the line that is symmetric about the reflective surface's normal. Accordingly, specular reflection as used herein is that reflected component that follows the simple textbook relationship where the magnitude of the angle of reflection is equal to the magnitude of the angle of incidence when measured from the normal (perpendicular) to the surface where the incident light impinges; wherein the plane of angle measurement includes the incident light ray, the surface normal, and the reflected light ray. The specular reflection angle is equal in magnitude but opposite in sign to the angle of incidence because they are symmetric about the surface normal. (For practical application, the size of the aperture of a light gathering device influences whether reflected light is deemed a specular component of the overall reflection profile.) According to this geometric definition of specular reflection, even a Lambertian reflector surface has a specular component, albeit that component representing only a small fraction of the total amount of light reflected by the surface.

The ability to achieve the specular reflection desired for a mirrorlette surface is associated with a second and much smaller scale of dimension than that of figure: surface roughness, termed "surface finish." Surface finish quality is measured relative to the surface roughness as examined on a scale with units near the wavelength of the light to be reflected. A metric for mirrorlette surface finish is rms surface roughness in wavelength units. FIG. 2 suggests the two-dimensional relationship between surface finish and the fraction of light that is not reflected specularly. The curves show the spread of reflection for root-mean-square (rms) finishes of a tenth 18, a half 20, one 22 and two 24 wavelengths relative to the ideal specular line 26. The ability of a projection screen of the mirrorlette type to operate in a bright ambient environment is heavily dependent on both a proper figure and an exceptional specularity in surface finish. The need for the latter is emphasized even further when depicted in three dimensions, rather than just the two dimensions of FIG. 2. For visual light the scale of surface finish must be considerably sub-wavelength to reduce the non-specular reflection to a level that allows enough deflection of strong light away from the viewing volume to maintain high image quality. Typically, the rms surface roughness for visual light must be less than 0.1 micrometer. The rms of 0.1 micrometer for visual light results in curve 18.

Routine machine cutting and grinding techniques used to cut an individual mirrorlette figure yield far rougher surfaces than 24. This is far from the optical quality finish needed to produce extreme levels of specularity. Accordingly, optical polishing must follow machine cutting and machine-grade polishing of mirrorlette elements. Generally this process is via a sequence of smaller and smaller grit abrasives used on each of the mirrorlettes, which necessitates extreme alignments and sequencing for many thousands of small mirrorlettes. Short of optical polishing, chemical and electronic etching techniques might be employed to achieve the desired optical surface. However, for several reasons, including micrometer-sized variations in chemical reactivity for chemical processes and electric field variations for electronic processes, neither of these options is readily applicable to achieving curve 20 or better on a large scale in the laboratory, let alone is any of them commercially practical. Similar phenomena negate the use of plating techniques to achieve an infilling of roughness that remains after machining of the mirrorlettes. (It should be noted that injection molding, etc., replicates most of the machining flaws.) Processes like chrome plating might seem to yield sufficient infilling to yield optical quality surfacing, however, this is far from the case. Pleasing shininess is achievable with curve 24, but it does not support high resolution. Neither does it support off-axis rejection of bright light (such as sunlight) that seriously degrades resolution, contrast, color saturation and polarity. Still, it should be pointed out that extreme surface finish is not a requirement for high screen gain; it is a requirement for bright light rejection.

Prior art for high-gain screens has been based on developing a surface of appropriate figure, then imparting to that figure a surface of proper finish. In some cases, such as injection molding and electroform replication of a master tool, the surface finish is imparted concurrently with the imposition of surface figure. Although the surface figure may be adequate for achieving screen gain, the finish (curve 24 or worse) is not adequate for rejection of bright lights (which requires finish of curve 20 or better). Even a small residual of diffuseness resulting from less than optical quality sub-wavelength finish will negate the ability to reject strong environmental lighting. That is, the key to screen gain with rejection of unwanted backgrounds rests more with making the fraction of light in the diffusely scattered light component smaller than with making the fraction of light in the directively dispersed light component greater. This is a very crucial nuance for screen technology.

Another hurdle associated with machine-made and subsequently optically polished mirrorlettes is the extreme difficulty in fabrication of convex mirrorlettes. The margins between one mirrorlette and its neighbors often must be very thin (fifty micrometers or less for a one-millimeter mirrorlette). Such narrowness in an array of tens or hundreds of thousands of mirrorlettes per square meter is exceedingly difficult to maintain. With concave mirrorlettes, a curved cutting tool easily and consequently produces narrow edges, but these are ridges that are easily damaged in situations associated with common use of projection screens. (Further, such ridges have electrostatic consequences.)

Another shortcoming of prior art is its inability to provide a high-quality screen with real-time variable gain. While prior art facilitates some forms or real-time change to the gross shape of an entire screen, as with U.S. Pat. No. 4,022,522 to Rain (1977); this is of no value to modification of gain. In essence, prior art adjustability fails to provide a projection high-gain screen with real-time variable gain.

Regarding prevention of glare and speckle using prior art: Glare is a collective effect whereby large sections of the screen present the desired projected image, but superimposed on the image are large bright patches. Glare patches are similar in general appearance to the glare obtained when the screen patch is simply a standard specular mirror. The apparent physical size of the glare encompasses many of the cells used in the high-gain architecture. This idea is portrayed in FIGS. 1 and 3. The appearance of glare as depicted in 28 (FIG. 1) and 30 (FIG. 3) might be conceptualized in terms of small nearly-planar mirrors set next to each of most of the cells, with the angle on the mirror such that it directly reflects back into the viewer's eyes the nearly collimated light of the projector. A metric for glare is based on the fractional size of a screen region whose periphery 32 is defined by a brightness angular rate-of-change exceeding the screen-design rate of change by at least a factor of two and maintains that excessive brightness, or more, throughout the region, which need not be symmetric. Ideally, a screen will have no glare. The metric assumes projection of a uniformly bright image.

Glare is common to high-gain screen designs that use continuous surface mirrorlettes, such as used in U.S. Pat. No. 4,297,001 to Antes, et al. (1981). Techniques of this nature produce curved specular surface cells with a desirable shape for high gain over the center of each mirrorlette cell, but that also produce notably excessive gain (in essence a glare) rather than uniform dispersion of the projector light. The glare comes from the transition surface between the mirrorlette cells, where the curvature angles are considerably flattened. The cusp-like grooving technique used in the electroforming approach of U.S. Pat. No. 3,994,562 to Holzel (1976) somewhat alleviates glare, but at the severe expense of excessive scattering of off-axis background light due to the finish limits of electroforming. Also, this prior art has practical limitations in seamless screen size. Glare can be reduced using other prior art, such as was employed in U.S. Pat. No. 4,235,513 to Vlahos (1980), wherein the advantage of continuous surface is foregone, making it necessary to individually fabricate and mount each mirrorlette onto a tile and replicate by electroforming with its finish quality limits. A related approach was taken in U.S. Pat. No. 4,040,717 to Cinque, et al. (1977), wherein concave cells were individually constructed, with the attendant disadvantage in production simplicity and the exposure to damage of the cell edges because of the concave architecture. Catadioptric screens, typified in U.S. Pat. No. 4,068,922 to Dotsko (1978), U.S. Pat. No. 4,298,246 to Iwamura (1981), U.S. Pat. No. 4,606,609 to Hong (1986), and U.S. Pat. No. 5,625,489 to Glenn (1997), along with others, generally still display glare from the binding materials or lenslette front-surface effects, but at least the glare tends to be at more acceptable levels than with other prior art. However such screens perform poorly in many of the other screen metrics when they are operated in strong ambient light.

As mentioned previously, glare 28 and 30 is a collective property of the screen element area and speckle 34 and 36 is a localized area effect, as depicted in FIGS. 1 and 2. Speckle is the result of a notably higher gain at a small location separated in the observer's view by several visual resolution elements. A metric for screen speckle is, assuming uniform projected image brightness, the number of speckled resolution elements relative to the total number of resolution elements. A good design goal is for the speckle count to remain below one in ten thousand.

Speckle appears like a star-field superposition of bright spots on the image. As in the case of stars, speckle points as focused on the retina need not be as large as a retinal cell; they simply need to evoke a response in the cell that is notably larger than the evocation from light on neighboring clusters of cells. A common tactic in prior art reduces speckle by making screens with a multitude of scattering elements in an area very much smaller than the eye's resolution. Thus, the speckle is reduced by integration of many random scatterers. However, as expected with stochastic events, probabilities exist that an occasional integration region will still be excessively brighter than its neighbors and appear as a speckle. This can be observed in most glass bead screens and many reticulated screens.

Regarding control of angular cutoff rate using prior art: The ability to control the angular cutoff rate 38 (FIG. 1), wherein the notch shows a change in brightness relative to a change in angle, is important to the rejection of strong ambient light. Further, an extreme cutoff rate such as depicted in FIG. 1 curve 16, allows a screen to present different images to different viewing volumes, without interference between the images, by using multiple projectors located at different angular locations as suitable to the viewing volume of each audience. Prior art, such as U.S. Pat. No. 5,112,121 to Chang, et al. (1992), attempt to achieve rapid enough cut-off to support distinct simultaneous viewing volumes via multiple offset projectors. In the case of Chang, a holographic screen is used. By the very nature of a holographic screen, it is exceedingly vulnerable to ambient light, will not sustain color integrity, has significant brightness sidelobes, and is highly sensitive to mechanical displacement.

A metric for angular cut-off rate is relative brightness change per degree of angle offset away from the optical axis of the specularly reflected projection beam. The ability to achieve cut-off rates of 99% per degree at the edge of the viewing volume is a desirable screen feature for operation in strong ambient light. Unitary-gain screens have no facility in this regard. Enhanced-gain screens of the catadioptric type using prior art have no significant capability for attaining sharp cutoff and wide viewing angles simultaneously. Enhanced-gain reflective mirrorlette prior art architectures allow somewhat more angular viewing volume control. However, their rate of cutoff, when scaled as a fraction of the total angular extent, is not selectable; nor does it approach 99% per degree on all viewing volume edges. Prior art does not accommodate decoupling of the ability to control angular cutoff rates from the ability to control angular viewing volume.

Regarding maintenance of contrast darkness using prior art: A metric for overall image contrast is the ratio of the brightness measured in the lightest area of the image to the brightness measured in the darkest part of the image. In order to efficiently provide a viewer with a high-contrast projected image in bright ambient light, the availability of high-screen gain is not sufficient. This is because contrast is not driven by brightness alone. Contrast is also the result of how well the screen can reproduce the dark elements of the image. FIG. 4 assists understanding of this fact. If the brightest area 40 of the projected image has an inherent intensity of 10 units and the darkest area 42 an inherent intensity of 1 unit, then the overall brightness contrast ratio is 10, as depicted in FIG. 4 curve 44.

Table Associated with Curve 44 of FIG. 4
Contrast for Picture Element Having Listed Projected Light Level
Assume Minimum Projected Light to Be 1 Unit
Background (non-image) Light Seen by Observer is Constant at Zero Units

| Projected Image Light (Arbitrary Units) | Background (Non-image Light) (Arbitrary Units) | Contrast Equation | Contrast |
|---|---|---|---|
| 1 | 0 | (1 + 0)/(1 + 0) | 1.00 |
| 2 | 0 | (2 + 0)/(1 + 0) | 2.00 |
| 3 | 0 | (3 + 0)/(1 + 0) | 3.00 |
| 4 | 0 | (4 + 0)/(1 + 0) | 4.00 |
| 5 | 0 | (5 + 0)/(1 + 0) | 5.00 |
| 6 | 0 | (6 + 0)/(1 + 0) | 6.00 |
| 7 | 0 | (7 + 0)/(1 + 0) | 7.00 |
| 8 | 0 | (8 + 0)/(1 + 0) | 8.00 |
| 9 | 0 | (9 + 0)/(1 + 0) | 9.00 |
| 10 | 0 | (10 + 0)/(1 + 0) | 10.00 |

Table Associated with Curve 48 of FIG. 4
Contrast for Picture Element Having Listed Projected Light Level
Assume Minimum Projected Light To Be 1 Unit
Background (Non-image) Light Seen by Observer is Constant at 10 Units

| Projected Image Light (Arbitrary Units) | Background (Non-image) Light (Arbitrary Units) | Contrast Equation | Contrast |
|---|---|---|---|
| 1 | 10 | (1 + 10)/(1 + 10) | 1.00 |
| 2 | 10 | (2 + 10)/(1 + 10) | 1.09 |
| 3 | 10 | (3 + 10)/(1 + 10) | 1.18 |
| 4 | 10 | (4 + 10)/(1 + 10) | 1.27 |
| 5 | 10 | (5 + 10)/(1 + 10) | 1.36 |
| 6 | 10 | (6 + 10)/(1 + 10) | 1.45 |
| 7 | 10 | (7 + 10)/(1 + 10) | 1.55 |
| 8 | 10 | (8 + 10)/(1 + 10) | 1.64 |
| 9 | 10 | (9 + 10)/(1 + 10) | 1.73 |
| 10 | 10 | (10 + 10)/(1 + 10) | 1.82 |

If unwanted environmental light scatters as little as 5 units of light into the viewer's vision, as shown in curve 46, then the brightness contrast ratio deteriorates to (10+5)/(1+5)=2.5. For a brighter environmental source, such as modest skylight, 10 units of intensity might scatter into the viewer space, for which the mirrorlettes are designed, as shown in curve 48. This yields degradation from the original 10:1 brightness contrast ratio down to 1.8:1. For impingement of direct sunlight on a high-gain glass bead screen the ratio typically deteriorates to 1, which means the complete loss of a viewer's ability to see the projected image. Clearly, the dark components in a projected image are the most vulnerable to strong environmental light.

The majority of prior art screens have been relegated to use in subdued lighting, or to accepting the multiple metric deficiencies using the limited capabilities of prior art attempts to design screens suitable to strong ambient light. Prior art such as U.S. Pat. No. 6,384,970 to Abe, et al. (2002), U.S. Pat. No. 4,235,513 to Vlahos (1980), U.S. Pat. No. 4,298,246 to Iwamura (1981), U.S. Pat. No. 4,767,186 to Bradley, Jr., et al.

(1988), U.S. Pat. No. 4,911,529 to Van De Ven (1990), U.S. Pat. No. 6,040,941 to Miwa, et al. (2000), to indicate just a few, have fitted screen elements with light-absorbing baffles or light-absorbing masks, with modest increases in the level of environmental lighting that can be tolerated without undue deterioration of the projected image's contrast. Taking a different tack on the problem, U.S. Pat. No. 5,210,641 to Lewis (1993) goes so far as to produce an angular pass filter to overlay optical cells for absorbing or rejecting off-axis light. Other prior art, such as U.S. Pat. No. 5,296,965 to Uetsuki, et al. (1994), U.S. Pat. No. 5,335,022 to Braun, et al. (1994) and U.S. Pat. No. 5,625,489 to Glenn (1997) try to subdue ambient light by using mismatched polarization with screens relative to room lights. These latter prior arts unfortunately destroy the ability to employ polarization advantages that are discussed later, and they also decrease screen gain.

Deflection of impinging bright non-projector light away from the viewing volume requires an optical surface and a cell figure that is not practically achievable for large arrays of small mirrorlettes using prior art. While prior art finishes may be acceptable for modest environmental lighting levels, they are deficient for bright sources, such as direct illumination with car lights, daylight, and sunlight.

The number of patents in this arena is a clear indicator of the importance placed on background rejection. However, prior art for background rejection including the use of mirrorlettes fails to achieve suitable metric levels for the complete set of other desirable screen attributes.

Regarding conservation of gray scale linearity (and quantization) using prior art: In the above discussion of contrast maintenance under bright ambient lighting conditions only the effects on the extremes of darkest and lightest image areas were considered. However, the same effect is imposed on all the intermediate levels of brightness within an image. The result is a delinearization of the original image's gray scale. That is, the ratios of brightness for various areas in the image as seen by a viewer are changed from the ratios of brightness provided by the projector for those very same areas. This loss of projected image grayscale fidelity demonstrates that the effect of the ambient light on contrast ratios is not limited only to the areas of maximum image brightness and darkness. The loss of gray scale linearity is depicted in FIG. 4 curves 46 and 48. On curve 44 (which does not have gray scale linearity loss) can be seen levels of viewed image brightness corresponding to levels 2, 4, 6, 8 and 10 units of projected image brightness. For a darkened environment, the ratios for viewed image brightness will match those of the projection itself. However, for ambient lighting conditions 46 and 48, the ratios associated with viewed image brightness do not match those for the projection image brightness. The linearity of the image gray scale has been lost. Prior art offers help in this regard to some extent by increasing the screen gain. This allows the fractional impact of the ambient light to be reduced. However, for very bright environments the ability of prior art to conserve gray scale linearity is significantly limited for the same reasons presented in the contrast discussion. Indeed, for direct sunlight conditions the projection image using prior art would need to be so bright as to keep a viewer from even looking at it. Further, the needed projection lamp power would likely burn up the image storage medium.

A metric for conservation of gray-scale linearity is the ratio of image contrast slopes. These are obtained by calculating the contrast range of the viewed image divided by the contrast range of the projected image. The grayscale linearity for curves 44, 46 and 48 in FIG. 4 are 1.0, 0.25 and 0.18, respectively. Values below 0.5 noticeably degrade viewed image quality relative to the projected image.

Regarding maintenance of image uniformity using prior art: In general, projection screens are deemed better if they support a uniformity of brightness across their extent. If the screen changes its image brightness slowly with angle, then the uniformity is often acceptable to a viewer. If it falls off too rapidly, then the viewer may not be pleased with the image. This fall-off is different than that associated with purposeful use of screen gain, and is not the same as glare effects and speckle. However, one metric for image uniformity is a variation on the aforementioned image glare metric. For uniformity, the glare metric is applied with various brightness differentials, as suits the aims of the screen designer. A screen art should be capable of producing various uniformity metric values. This is not the case with the majority of prior art.

FIG. 3 shows intensity isocontours 51 illustrating uniformity 50, and image non-uniformity in the form of glare 30, and speckle 36 as they are associated with the rate of change in image brightness produced by the screen. Prior art addresses uniformity roll-off in many ways, sometimes at the expense of other screen metrics. For example, in U.S. Pat. No. 5,541,769 to Ansley, et al. (1996) the provision of uniform brightness is so important as to sacrifice brightness by purposely applying absorption to diminish the amount of light reflected from areas that are brighter than others. This means that the maximum brightness level is governed by the poorest unadjusted element, which provides for very inefficient use of projection energy. With mirrorlette screens, prior art imparts curvature to the overall screen to maintain brightness uniformity across the screen as seen within the viewing volume.

By definition, unitary-gain Lambertian screens will be uniform, but projected image quality will suffer greatly from scattering of ambient light into the viewing volume. The ambient light might not impinge the screen with the same brightness everywhere on its surface. In such circumstances, the result will be a non-uniform viewer image. The same is true for all diffusion screens that approximate Lambertian light-scattering profiles.

Regarding reproduction of color saturation and color hue using prior art: When a bright ambient light is scattered into the viewing volume, the ambient light that adds to the image-forming projection light can change the saturation and hue of the image color. If the impinging ambient light is white, then its addition causes the image color to lose its saturation and become more pastel. If the ambient light is not very white, and therefore relatively saturated, then any difference in color from the image light causes a shift of the image hue toward an intermediate hue. These effects are illustrated in FIG. 5, wherein the hue 52 of the color is indicated by the angle to the color as measured between a radial reference line 54 from the center of the circle, and the saturation 56 is highest at the radial distance of the circumference. The length L1 of saturation line 56 defines the magnitude of saturation. Neutral color from black through white is represented by the circle's center point 57. FIG. 5 depicts the desaturation and the hue shift of an image color 58 as separate events caused by ambient light color 60 scattering into the system.

However, ambient light generally has characteristics that cause both desaturation and change in hue of projected images at the same time. The amount of radial displacement 62 is a metric for saturation fidelity, with a smaller amount of radial displacement 62 being more desirable. The length L2, of radial displacement line 62 defines the magnitude of saturation fidelity. The amount of angular displacement is a metric for hue fidelity, with a smaller amount of angular displacement being more desirable, and having an angular length L3 defining the magnitude. Ambient light color 60 mixes with color 58, causing angular displacement L3, resulting in color 64.

Prior art can enhance screen gain and thereby increase the amount of light from the projected image relative to ambient sources. This reduces, but does not negate, the detrimental effects of the ambient light. And prior art is unable to drastically reduce color desaturation and hue shift while still retaining the other needed attributes that are being delineated in this discussion of image metrics. In fact, some techniques used to increase screen gain, as with glass bead and lens array catadioptric screens, introduce additional problems, such as chromatic effects due to the beads having different refractive indices for different colors. Reflective mirrorlettes using prior art can be more effective in reducing desaturation and hue shift, but not at the same time that glare and speckle are defeated.

Regarding preservation of resolution using prior art: Another effect of ambient light is loss of image resolution, which manifests itself to a viewer in many ways, including added difficulty in perceiving faint objects near bright objects and reducing the ability to separate fine detail. One metric useful for resolution issues is to determine the smallest size of high-contrast parallel lines (equal in width and spacing) in the projected image that will be sustained with an acceptable contrast level in the viewed image. Because of the scattering of light transversely within many unitary gain screen designs, such as plastic diffusion films, there is considerable loss in ability to see small detail. The brighter spots of light diffuse into nearby darker spots of the projected imagery. This effect, also noted in catadioptric screens, deteriorates the delineation of object edges and masks over small image elements altogether. Also, it is to be remembered that resolution by human vision is a function of brightness differentials between neighboring image elements and maintenance of original image brightness profiles, such as grayscale linearity. Thus, while prior art mirrorlette screens can offer reduction in transverse scatter compared to unitary-gain screens and catadioptric screens, the glare components of prior art mirrorlette screens will deteriorate image resolution as well. Further, mirrorlette screens based on drawing-out melted plastic shapes are vulnerable to surface striations and inhomogeneities that add to glare and speckle.

Some prior art mirrorlette concepts require polishing of individual mirrors that then serve as the tools for replication using technologies such as electroforming. Because of the practical size considerations for such optical polishing processes, the resultant mirrorlette cell sizes are too large for close viewing as would be characteristic of conference rooms, in-door motion picture theaters, home entertainment centers, and simulators. This limitation leads to an inability to maintain the resolution of projected images, and in cases of the larger mirrorlette sizes, will lead to Moire patterns.

Regarding avoidance of Moire patterns using prior art: Some inventors of prior art, such as Antes, U.S. Pat. No. 4,297,001 to Antes, et al. (1981), have suggested the need for randomness of centers and sizes for dispersion elements in mirrorlette screens. Accordingly, randomness is a feature in the Antes invention. Modern sampling theory shows this suggestion to be without merit, however. In fact, it is image-sampling frequency that matters, whether or not the light dispersion centers are randomly placed. In fact, a good metric for Moire prevention is the factor by which the spatial frequency of placement of the screen dispersion centers exceeds an information-theory criterion called the Nyquist sampling rate. Prior art in mirrorlette techniques cannot provide a high metric value in this arena, for typical requirements of screen resolution and viewing distance, and still demonstrate good values in the other metrics. Also, with a fabrication process such as delineated in Antes, the randomness, if it could be obtained, would work against rapid angular cut-off, against avoidance of speckle, and against uniformity of brightness because in a truly random case the radius of curvature of the bubbles upon which the invention relies would be different for every mirrorlette. The radius of curvature of the mirrorlette, and the angle the optical axis of the projector makes with the normal to the mirrorlette surface at the mirrorlette edges, are what govern the dispersion angle for mirrorlette techniques.

Regarding minimization of depolarization using prior art: Beyond the aforementioned shortcomings of catadioptric screens for bright light environments, it is found that reflections from glass bead screens, and from most lens array screens, do not maintain the polarity of incident light. This is a serious drawback whenever the use of polarized differentiation is desired. For example, the preferred mode for 3D movies is to cast two images simultaneously on a screen. One image is intended for processing by the viewer's left eye and the other for processing by the viewer's right eye. The two images on the screen, each image cross-polarized to the other, are separated out by providing the viewer with glasses having a properly oriented polarizer in each of the two lens openings. The images are appropriately observed in the correct eyes in accord to the cross polarization of the lenses, each of which blocks out the inappropriate of the two images.

However, because a glass bead screen and other catadioptric screens do not adequately maintain the projected image polarizations upon reflection of the projected light, 3D is lost and the gain afforded by the screen for normal viewing is useless. A metric for polarization maintenance is the ratio of the brightness of the viewed image when viewed through a polarizer having alignment with a projected polarized image, to that when the viewer looks through the polarizer rotated 90 degrees (cross-polarized). Prior art screens that demonstrate significant gain and any notable amount of ambient light rejection have polarization brightness ratios of five and less.

The film industry, using prior screen art, had to resort to essentially no-gain screens. This was a major element in the lack of 3D development. The projector intensity had to be so great to overcome the loss in transmission through the viewing glasses that film was overheated and prematurely deteriorated. Also, because even no-gain screens do not maintain fidelity of polarization, the image separation was still poor. The result was overlapping and cross-feeding between the eyes, which gave headaches and eyestrain to the viewers, as well as presented poor imagery.

Silver/Silver lenticular screens provide a gain modestly higher than unity, but shift colors toward the blue and have a tendency toward glare. Yet this screen is still considered by many as the best prior art medium for 3D projection. Mirrorlette screens, in the theory of some prior art, would seem to provide an even greater improvement. However, prior art screens would not provide minimization of depolarization at the same time that glare, speckle, uniformity, resolution, and darkness metrics are met for strong environmental light applications.

Regarding broadband spectral performance using prior art: projection screen utility is not limited to the visual realm of the electromagnetic spectrum. Many simulation systems require a screen that functions in other spectra, such as ultraviolet, near-infrared, and thermal infrared. None of the projection screen prior art that is based on catadioptric techniques can accommodate this range of projection spectra. Enhanced gain in the visual wavelengths is no indicator of similar gain in the other spectral regions. The spectral range cannot be greater the spectrum transmitted by the glass, polymer, or other material used for the refractive elements. Accordingly, a screen such as a glass bead screen not only lacks gain at wavelengths outside of the visual spectrum, it is not even functional outside that spectrum. This means the screen cannot be used in arcades where the designating light from the guns is too far into the ultraviolet or the infrared realms. It also means that glass-bead screens cannot be used for simulation of thermal infrared screens, as in desirable for such activities as military training and night-vision equipment development.

Enhanced-gain mirrorlette screens defined in prior art can increase the range of spectral performance beyond the visual realm, but not with preservation of good metrics for resolution, glare, speckle, uniformity, and sharp angular cutoff.

Regarding commercial viability using prior art: Commercial viability for a projection screen, assuming the existence of a market, includes factors associated with manufacturability, reliability, maintainability, safety, weight, pliability, cost, and other factors as demanded by the aforementioned market.

Unitary-gain screens are readily found in the marketplace, or made from readily available materials such as paint and cloth. Although there may be many variations in unitary screen approaches, few are outlandishly expensive or operationally impractical; and few are likely to fail because of an error in a basic concept. This can be understood by the representatively different approaches illustrated in such U.S. patents as U.S. Pat. No. 4,006,965 to Takada, et al. (1977), U.S. Pat. No. 4,190,320 to Ferro (1980), and the like.

The situation is similar for simple catadioptric and reticulated screens that claim attainment of enhanced gain using uncomplicated fabrication techniques, such as U.S. Pat. No. 4,025,160 to Martinez (1977), U.S. Pat. No. 4,068,922 to Dotsko (1978), U.S. Pat. No. 4,089,587 to Schudel (1978), U.S. Pat. No. 4,191,451 to Hodges (1980), and U.S. Pat. No. 4,206,969 to Cobb, et al. (1980).

Enhanced-gain reflection-only screens have not been as successful in the marketplace as the aforementioned architectures. Production cost is a major factor. For example, an Internet and literature survey to locate a screen having the architecture of U.S. Pat. No. 4,235,513 to Vlahos (1980) was unsuccessful. Further inquiry with three of the largest screen companies in the world (DaLite, Draper and Bedford) also failed to locate a screen of the aforementioned patent's type. Likewise, efforts to find screens based on the concepts of U.S. Pat. No. 4,235,513 to Vlahos (1980) were also unsuccessful. In this latter case, the lack of large-scale commercialization may have had basic technical origins.

Many inventions that hope for reasonable production viability rely on misconceptions and mistaken assumptions. For example, U.S. Pat. No. 4,235,513 to Vlahos (1980) relies on a constant contact angle between bubbles and the ability to stretch a contiguous array of bubbles made of plastic materials. The constant angle assumed for the invention only occurs in the plane that includes the centers of curvature for two bubbles and that is perpendicular to the tangent of the two bubbles where the plane passes. This angle does not hold for a contiguous array of bubbles and is different as the plane rotates around an axis normal to the plane of the bubble surfaces. Further, the formation of the bubbles and the array is not likely to behave like a group of soap bubbles. Soap bubbles act as they do because they are thin films and surface tension forces dominate over cohesion and gravitational forces. Weights per unit area of surface will be different with molten plastics than with soap bubbles. Clearly, results of experiments with soap bubbles cannot be automatically extended to other bubbles, including the effects of lateral stretching of a contiguous sheet of bubbles.

The purpose of the foregoing discussion of specific patents is not to attack the patents, but rather to illustrate how concepts that look like they are difficult to execute in a commercial sense likely will show themselves ultimately to be difficult to execute in practice. Further, patents based on erroneous assumptions may fail in the marketplace because they do not work as expected.

In the several aforementioned cases one can recognize that mirrorlette arrays have considerable advantages over other approaches for high-gain screens operable in strong environmental lighting. However, the ability to realize a technically and commercially viable mirrorlette array has not been available using prior art. The problem of progress in screen technology has not been a failure to recognize the potential for mirrorlettes. Rather, the problem of progress in screens has been that a viable method of manufacture for such arrays has been elusive, and even an optimal mirrorlette figure has been overlooked for lack of understanding. New inventions of method, of tooling, and of shape were needed to sufficiently address all the aforementioned projection screen metrics. Such are the elements of this present invention.

SUMMARY OF THE INVENTION

It is in view of the above problems that the present invention was developed. The invention is a projection-receiving surface that can function in some instances as a typical projection screen, and a method for making same. Specifically the invention relates to projection mirrorlette screens that even in strong ambient light can provide high gain, prevention of glare and speckle, high contrast, preservation of gray-scale linearity, uniformity of brightness, rapid angular cut-off, preservation of polarization, and ability to function over a large spectral range. These achievements result from a production method that utilizes purposeful partitioning of the material processes used in sub-wavelength morphology (finish) from the processes used to make super-wavelength morphology (figure). The fabrication art of the present invention departs drastically from previous art in that the finish of the mirrorlette is established before the figure of the mirrorlette, and the majority of figure is achieved without contact with any tooling or mold. Also, a purposeful mirrorlette shape of the present invention is selected from the group consisting of shallow catenaries and catenoid-like shapes.

The present invention provides performance values needed to produce a quality image in an environment of strong ambient light, even the strong light of direct illumination by the sun. The elements of the present invention that facilitate this are a novel and unobvious method of manufacture, a novel and unobvious article of tooling, and a novel and unobvious article of shape. These combine to yield a combination of metric levels never before available.

Regarding efficient production of projection-receiving surface brightness using the present invention: The present invention provides a method of curved mirrorlette production in which nearly any contiguous peripheral shape of mirrorlette can be achieved with a large option for magnitude of arc. Therefore, nearly any dispersion profile can be achieved, including those having different extents of dispersion in vertical and horizontal angles. Because, individual mirrorlettes are small relative to acceptable image resolution, observers are distant enough that the focal length of a mirrorlette is relatively inconsequential. Therefore, whether the mirrorlette is concave and forms a real focal point in front of (or possibly in back of) the projection-receiving surface or is convex and forms a virtual focal point behind the projection-receiving surface, the observer will see the same image and gain. The rejection of unwanted light will also be the same whether the mirrorlette is concave or convex.

Regarding prevention of glare and speckle using the present invention: The present invention is an array in which the area and the edges of the mirrorlette cells are in constant curvature in a controllable profile. This negates the production of unwanted collective effects that generate glare and eliminates the need for statistical integration to prevent speckle. A speckle metric of less than one in ten thousand is achieved by the present invention.

Regarding control of angular cutoff rate using the present invention: The present invention mixes mirrorlette curvatures and sizes that can be selected to generate a mix of angular dispersion profiles. The effects of the cells can collectively produce a desired angular cutoff rate. If the mirrorlette sizes and curvatures are kept the same, the cutoff rate can be extremely fast, giving a sharp drop-off in image as the viewer moves out of a pre-designed viewing volume. Without the rapid angular cut-off and extreme sub-wavelength surface finish of the present invention, spatially separable multiple images could not be observed without significant image cross talk. An angular cut-off rate of 99% per degree at the viewing volume edge is a preferred embodiment of the present invention.

The present invention can tune the angular cutoff rate from less than 1% to 99%, as needed for the audience and optical environment. A cutoff rate of 99% is valuable for multiple images on the same projection-receiving surface that are to be separated in accord with changes in viewing angle relative to the projection-receiving surface's normal. A rate of 10% or more is needed to obtain meaningful power gain. The present invention can tune the horizontal and vertical angular cutoff rates separately.

Regarding maintenance of contrast darkness using the present invention: The present invention includes a production method wherein the sub-wavelength finish of the mirrorlette is everywhere of very high optical quality, curve 18 or better, such that the mirrorlette area does not scatter even the most intense light into any angle other than that defined by specular reflection. Accordingly, it is preferred that a projection-receiving surface designer can trade off the cell figure, the projection-receiving surface orientation, the projector position, and the viewer location such that unwanted environmental light is deflected out of the viewer volume. In the preferred embodiment, even direct sunlight can fall on the projection-receiving surface without overwhelming the dark areas of the image. (As pointed out earlier, prior art cannot in any practical way produce large arrays of mirrorlettes with the requisite surface finish to achieve the needed metric.)

An advantage of this invention is an in-viewer-volume scattering ratio of less than 0.001 per steradian when tuned for operation in direct sunlight. For use in indirect sunlight (daylight) an advantage of the invention is an in-viewer-volume scattering ratio of less than 0.01 per steradian. For use in room light the present invention achieves an in-viewer-volume scattering ratio of less than 0.05 per steradian.

Regarding conservation of gray scale linearity using the present invention: A preferred embodiment of the present invention achieves specular displacement of environmental light to non-viewer locations to not only preserve contrast, but also to preserve gray scale linearity. A gray-scale linearity metric greater than 0.5 in direct sunlight is achieved by this invention.

A linearity metric greater than 0.75 is achieved by the invention under indirect sunlight (skylight). A metric greater than 0.9 is achieved under subdued room light conditions. A metric greater than 0.98 is achieved by the invention for use in a darkened theater.

Regarding maintenance of image uniformity using the present invention: The present invention provides a method to control individual mirrorlette shapes, which allows the dispersion to be made different at different locations on the projection-receiving surface, thereby providing a means to balance brightness if need be; though the uniformity of mirrorlette figure across the projection-receiving surface will already be uniform and adjustment will not normally be needed.

However, as with all very-high-gain projection projection-receiving surfaces, accommodation must be made for geometry. This accommodation is made with prior art by giving the overall projection-receiving surface a compensating curvature. The present invention allows production of mirrorlette arrays wherein a similar overall compensating curvature can be used, or wherein the option for putting a tilt on each individual mirrorlette facilitates the retention of a flat overall projection-receiving surface shape. Another preferred embodiment provides a method by which uniformity can be selected. A metric appropriate to quantification of uniformity is the root-mean-square (rms) variation of the projection-receiving surface's reproduction of brightness associated with a completely uniform illumination by a projector. The rms value for the metric should be determined at several sampling rates, and as a unit-less ratio of the absolute rms.

Regarding reproduction of color hue and color saturation using the invention: The present invention employs specular rejection of strong ambient light to prevent the shift of image colors, both in hue and saturation. In sunlight, prior art suffers desaturation well above 99%, while the present invention suffers desaturation well below 10%. The present invention can achieve reproduction of color hue to within 5-degrees on the color wheel for a darkened environment and 15-degrees on the color wheel for a white-lighted room. Additionally, the present invention maintains color saturation in direct, off-axis sunlight to within 25%, and in darkened room light to within 2%.

Regarding preservation of resolution using the present invention: The present invention provides a method to produce projection-receiving surfaces having several million mirrorlettes, each of which can be made considerably smaller than a millimeter in size. The projection-receiving surface easily can be made in accord with the present invention such that cells are not resolvable by the eye at distances closer than one meter. For projection signs, such as billboards, this invention can provide over 50-million mirrorlettes. This can sustain the resolution of the highest quality 35-mm projection film. Because the mirrorlettes are surfaced with such a high optical figure, the deflection of environmental light is complete and the ability for cells to cross talk is eliminated. A metric appropriate to preservation of resolution is the standard modulation transfer used for optical systems. The present invention achieves an averaged modulation transfer function that is flat within 0.05 throughout the image space from zero spatial frequency up to a spatial frequency of one-inverse projection-receiving surface cell in a darkened room, and flat to 0.15 in a lighted room.

Regarding avoidance of Moire patterns using the present invention: The present invention produces an array of mirrorlettes spaced close enough together to avoid production of Moire patterns. Even when a mirrorlette array of the present invention has a regular pattern, Moire effects are completely avoided by using an array density wherein the Nyquist criterion is met for image sampling. This is easily achieved with the present invention.

Regarding minimization of depolarization using the present invention: The present invention further provides curvature to every mirrorlette such that the electric field orientation of light during reflection rotates very little. With the present invention, isolation of cross-polarized projector and viewer filters can be greater than 500:1. This is hundreds of times better than prior art that attempts high-resolution, glare-free, high-gain, ambient-light rejecting projection-receiving surface metric values comparable to the present invention. In addition, the polarization isolation using the present invention is obtained without the projection-receiving surface brightness losses and the color shifts associated with prior art, such as with the industry standard for 3D movies: silver reticulated projection-receiving surfaces.

Regarding broadband spectral performance using the present invention: The present invention provides a broadband reflective projection-receiving surface in which the mirrorlette sizes can be set to accommodate longer wavelengths without diffraction. The projection-receiving surface of the present invention can be used into the long wavelengths of the far infrared as well as in the short wavelengths of the ultraviolet. Aluminum is one of the broadband coatings available to the present invention for surfacing the mirrorlettes. Such a coating supports reflection throughout the entire electromagnetic spectrum above 0.3 micrometers wavelength.

Regarding commercial viability using the present invention: The present invention is commercially viable production of a projection-receiving surface having high performance in each of the aforementioned metrics. The projection-receiving surface of the present invention includes factors associated with manufacturability, reliability, maintainability, durability, safety, weight, pliability, cost, and other factors as demanded by the marketplace. Accordingly, the present invention method of production addresses those factors. The unique method of the present invention is particularly cost effective and reliable. All these issues have been addressed and demonstrated in the process of experimentation with the present invention's concept. Thousands of square feet have been successfully fabricated using the production method of the present invention.

Unlike prior mirrorlette projection screen art, which is fraught with materials and fabrication problems, as well as fundamental technical shortcomings, as discussed earlier, the present invention is the first to be technically and commercially viable. The optical finish component of the present invention is readily available in the marketplace at modest price. The figure-governing component is a tool well within standard machine and forming practice to make. And the method for combining finish and figure is reliable. These factors support a reasonable production cost for a mirrorlette projection-receiving surface, another commercial necessity that heretofore has eluded the art. Further, unlike prior art, the projection-receiving surface of this invention can be made in very large seamless sheets. The projection-receiving surfaces can be thin, lightweight and pliable, as already demonstrated in experimentation. Protective coatings can be applied to shield against detrimental effects of cleaning and of environmental exposure.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
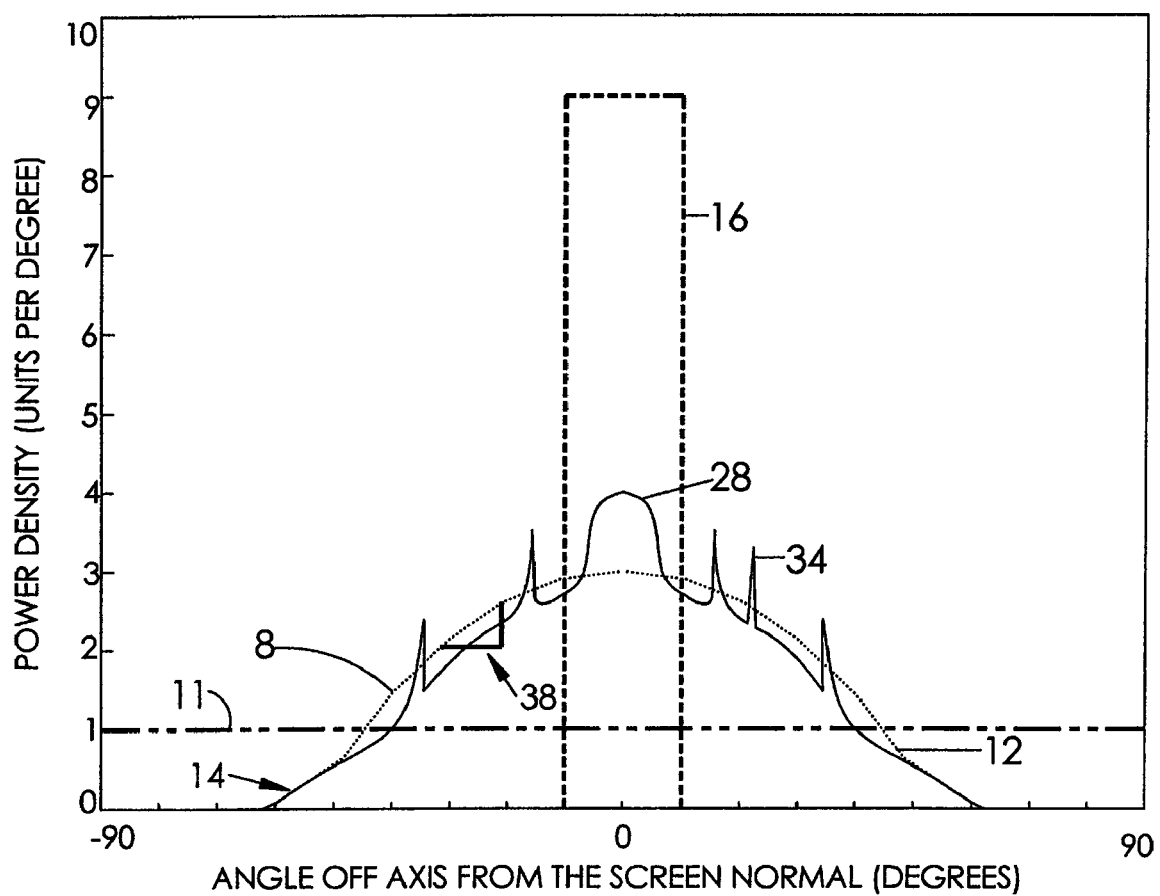
FIG. 1 illustrates two-dimensional brightness profiles for example projection-receiving surface types.
Figure 2:
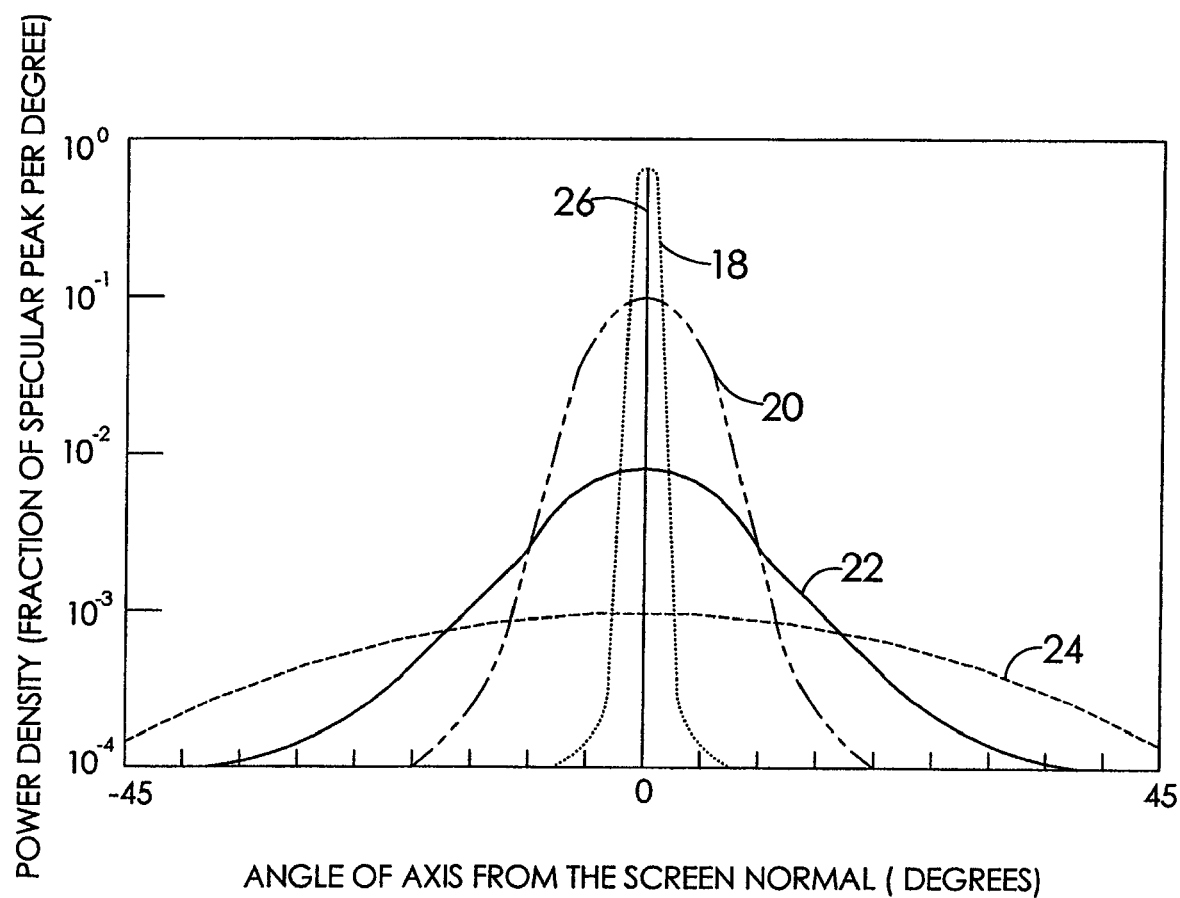
FIG. 2 illustrates a relationship between surface finish and diffusivity of reflection.
Figure 3:
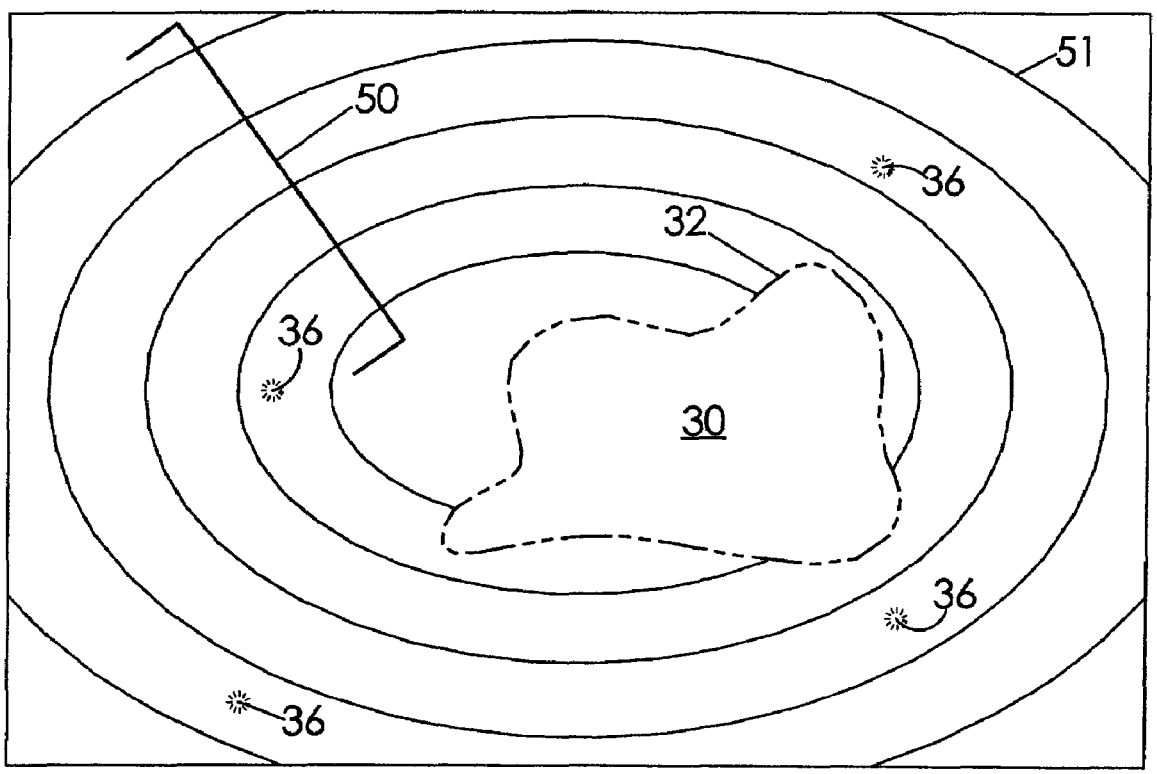
FIG. 3 illustrates concepts of glare, speckle, and uniformity.
Figure 4:
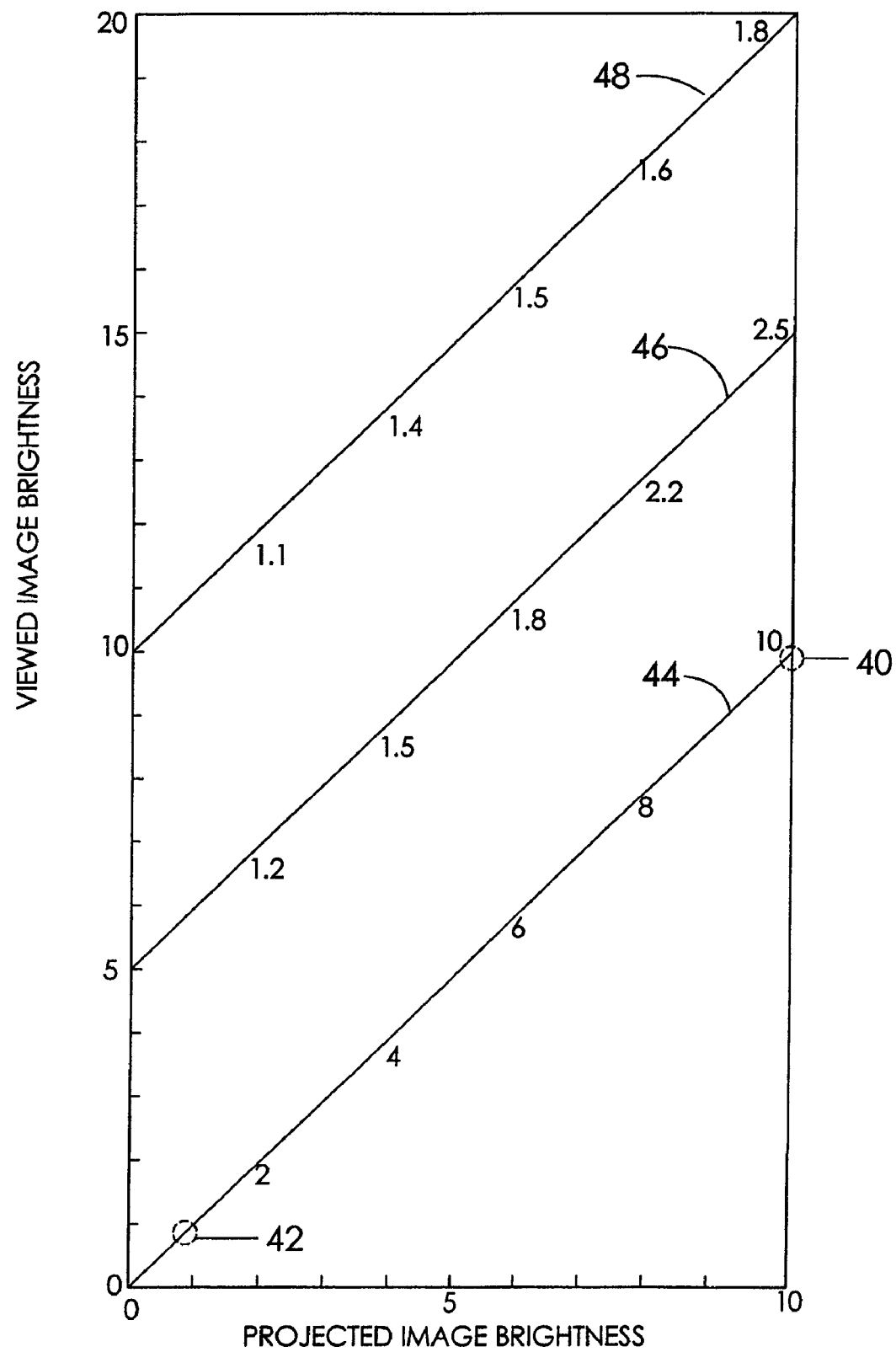
FIG. 4 illustrates degradation of image contrast and degradation of grayscale linearity as different levels of environmental light diffuse into the viewing volume.
Figure 5:
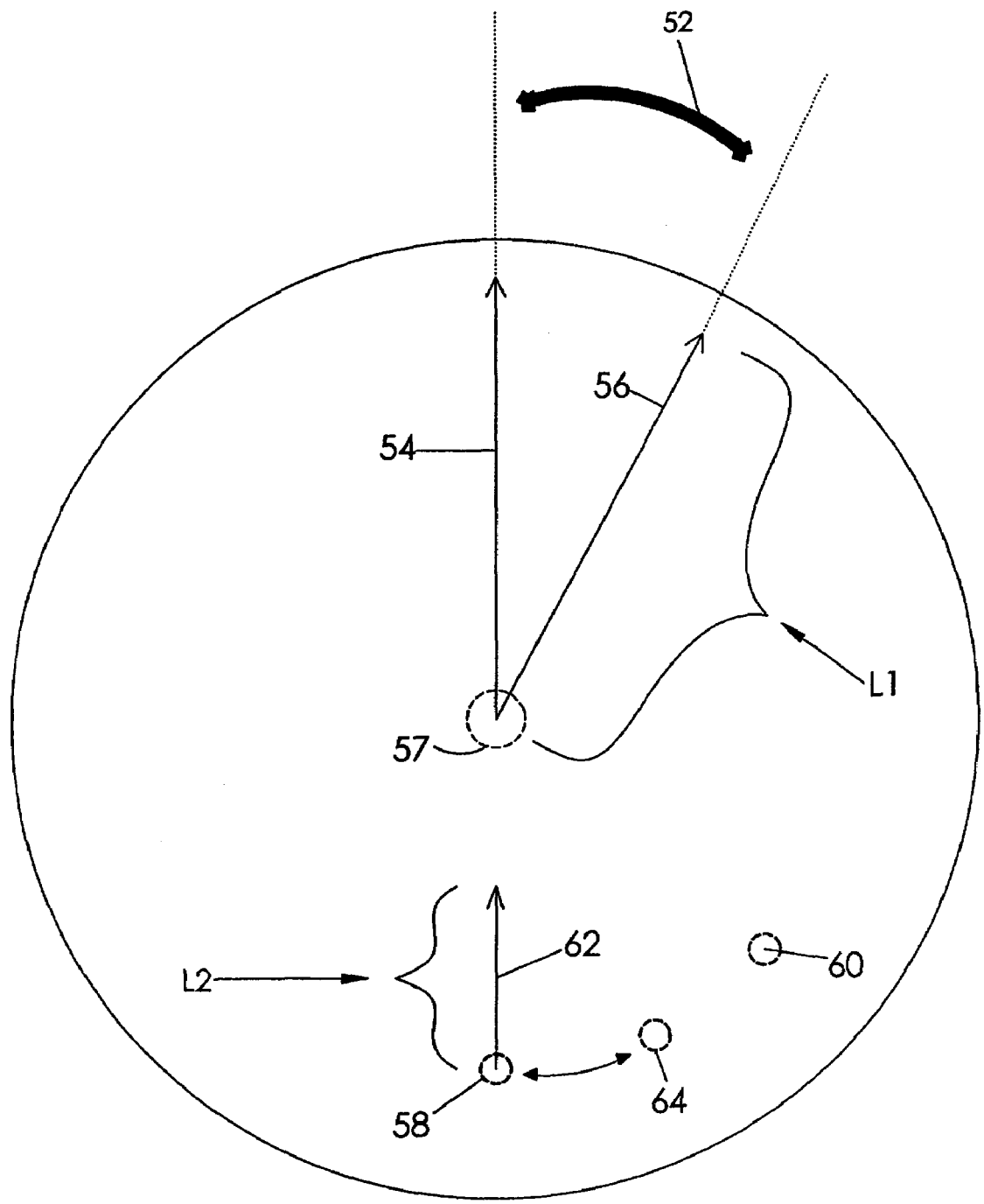
FIG. 5 illustrates the loss of color hue and color saturation as environmental light diffuses into the viewing volume.

Referring to the accompanying drawings in which like reference numbers indicate like elements, FIG. 1 shows the power density versus angle off-axis angle profile 16 obtainable with the invention. The rate of cutoff in the profile 16 is sharp enough that a second profile of the same shape 16 can be plotted on the same FIG. 1 without overlapping the first. In fact several of the profiles can be plotted on the same curve. This fact allows more than one image to be projected on to the same surface of the invention, each image being separately viewable without interference from the other. In FIG. 1 it is seen that with the non-invention profiles (8, 11 and 14) there is no way that the profiles can be repeated on the graph without overlap. This fact is a distinguishing characteristic of the invention, allowing a surface formed with the invention to contain multiple images, each image being viewable without interference from the other images. Recognizing that a projection receiving surface is two dimensional, and that FIG. 1 shows the profile only in one of the two dimensions, it is clear that several individual images can be presented where the particular image seen is dependent on the horizontal and vertical angle, relative to the screen, from which the surface is being viewed.

Figure 6:
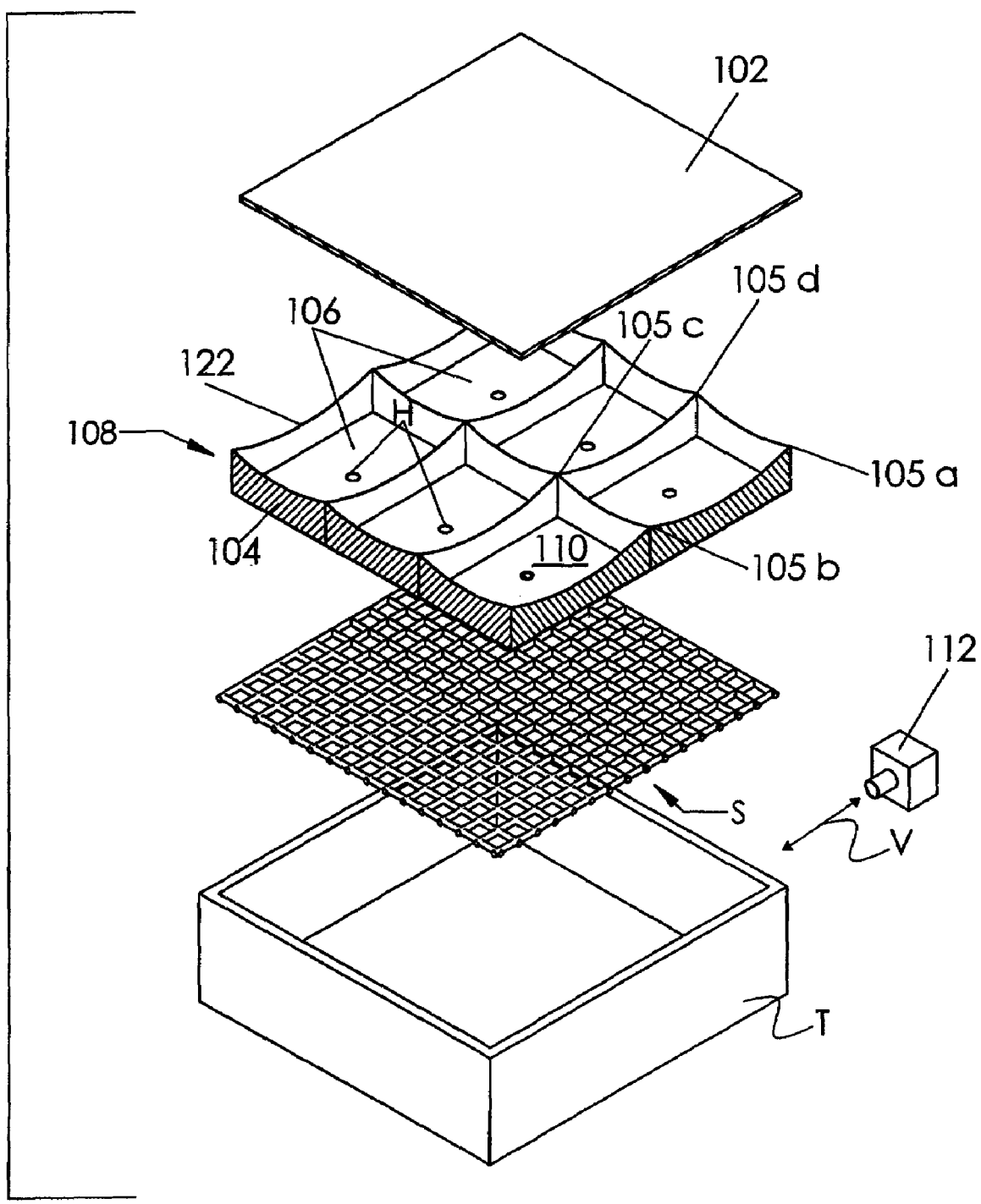
FIG. 6 illustrates mechanical parts of the present invention: high-finish pliable sheeting, an array of figure-governing cells, a spacing mesh, a tool holder, and a device for imposing an urging force.
Figure 8:
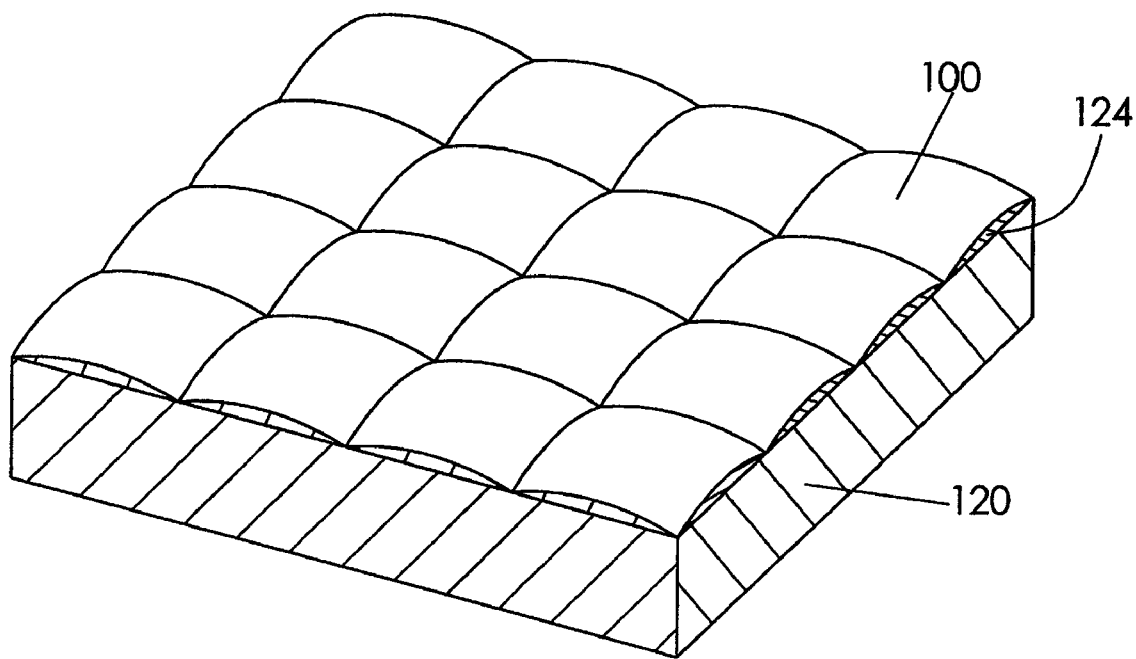
FIG. 8 illustrates a mirrorlette array fixated by a solid backing.

FIG. 6 illustrates a preferred embodiment of this invention, which produces mirrorlette FIG. 100, as illustrated in the perspective drawing of FIG. 8. The mirrorlettes are produced using a pliable deformable sheet 102 suspended across cusped ledges 104 at the periphery of contiguous cells 106 in a tool 108. Particularly suitable pliable, deformable sheets 102 (or films) include those from aluminized Kapton (0.5 to 1.0 thousandths of an inch thickness) from Dunmore Corporation, 145 Wharton Road, Bristol, Pa. 19007-1620 and aluminized polyester from Sigma Technologies of Tucson, Ariz. Four points 105a, 105b, 105c, and 105d, and on the cusped ledges 104 create sufficient friction to hold the sheet 102 in place during deformation.

The interior 110 of the cells 106 is recessed relative to the periphery defined by the cusped ledges 104. One side of the pliable sheet 102 has an optical-quality finish. The cusped ledges 104 of the cells 106 serve as catenoid-like suspension ledges to shape the pliable sheet 102 into a surface figure favorable to high-gain reflection. The key to achieving a catenoid-like shape is that the pliable sheet 102 is stretched between various stretching points such as 105a, 105b, 105c, and 105d, without having the pliable sheet 102 being deformed to any significant extent by cusped ledges 104. It is recognized that having portions of pliable sheet 102 can achieve a catenoid-like shape by using an array of bristles or blunt needle-like projections (not shown) that provide the same points of contact for pliable sheet 102, but that the most reliable way of catenoid-like mirrorlette formation is considered to be by use of the cusped ledges 104.

Figure 7:
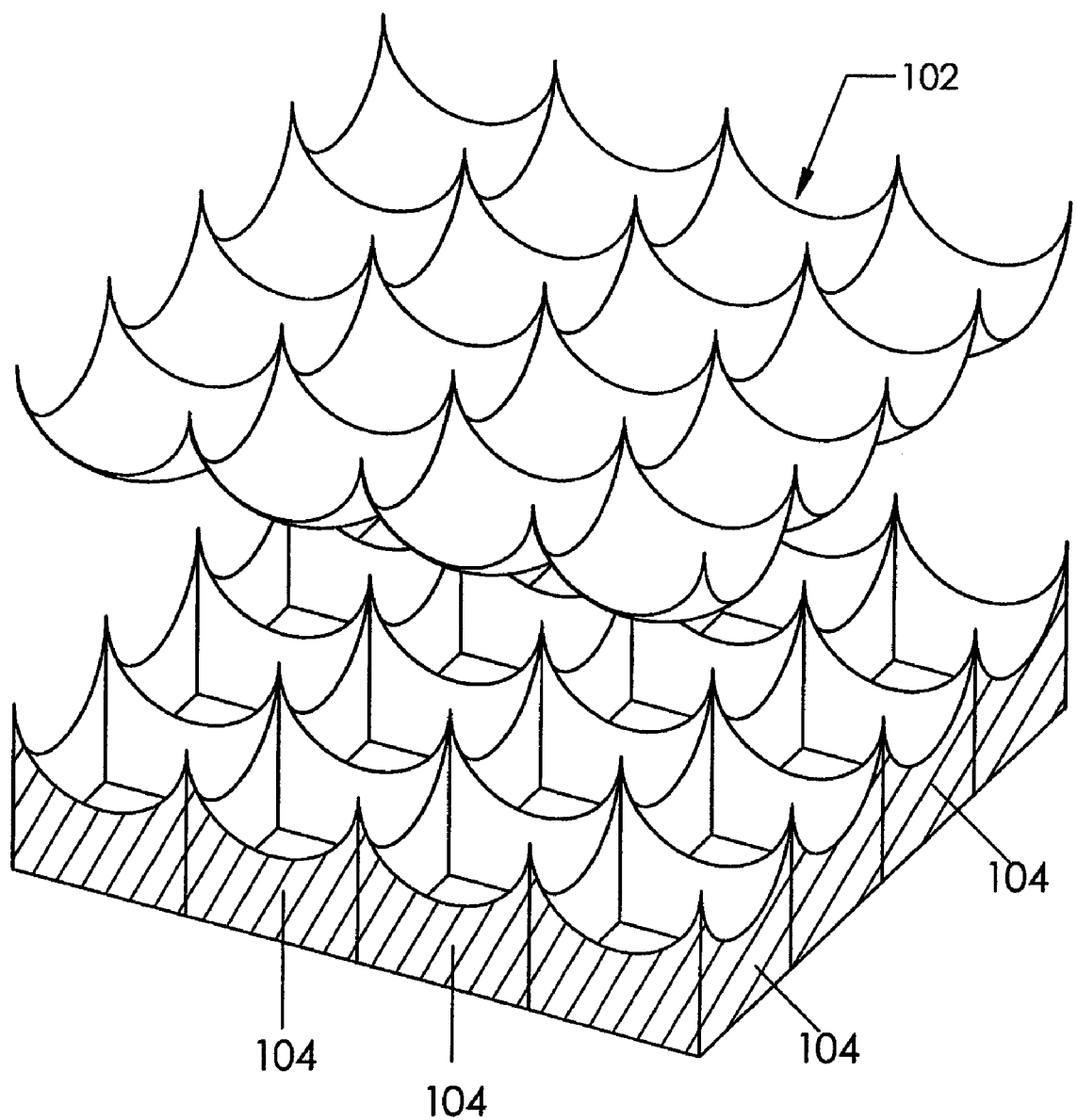
FIG. 7 illustrates deformable pliable sheeting deformed by an array of figure-governing cells.

A device 112 for creating a fluidic force differential between the two sides of the pliable deformable sheet 102 is used to subject the suspended pliable sheet 102 to a uniform urging force (as is a cable hung between two suspension points under the influence of gravity). In one preferred embodiment, a uniform urging force in the form of a fluidic force on the pliable deformable sheet 102 is provided by the device 112 producing a vacuum in the interior of the cells. As the vacuum is applied with increasing force, the pliable deformable sheet 102 deforms and thus begins to assume the shape of tool 108. However, as the sheet is deforming, but just prior to the sheet's 102 touching the interior 110, the vacuum force is stopped. It is noted that the uniform urging force may be from above, pushing the sheet 102 into each cell 106, or from below, pulling the sheet 102 into each cell 106, resulting in a sheet 102 as shown in FIG. 7.

In a preferred embodiment, the uniform urging force is applied from below. Specifically, a small hole H may be placed in the bottom of each cell 106. This small hole H provides a means for the vacuum force V of approximately 24 inches of pressure to be applied to the pliable deformable sheet 102. For a larger field of view, higher deformation is required, and more vacuum force V is used. For a narrower field of view, lesser deformation is required, and less vacuum force V is used. It has been found to work best when a manifold/mesh screen S is used between the small hole H and the vacuum source V (here applied through the side of tool holder T) to help equalize the vacuum pressure applied over the surface of the sheet 102, and further that manifold/mesh screen S may be used to separate the tool, shown generally at 108, from the tool holder T to prevent the tool 108 from becoming jammed in the tool holder. In a best mode, the small hole H is not placed at the bottom of each cell 106, unless the cusp is perfectly dimensioned. If the cusp is not perfectly dimensioned, it is possible to "skip" placing holes H in certain cells 106.

Figure 9:
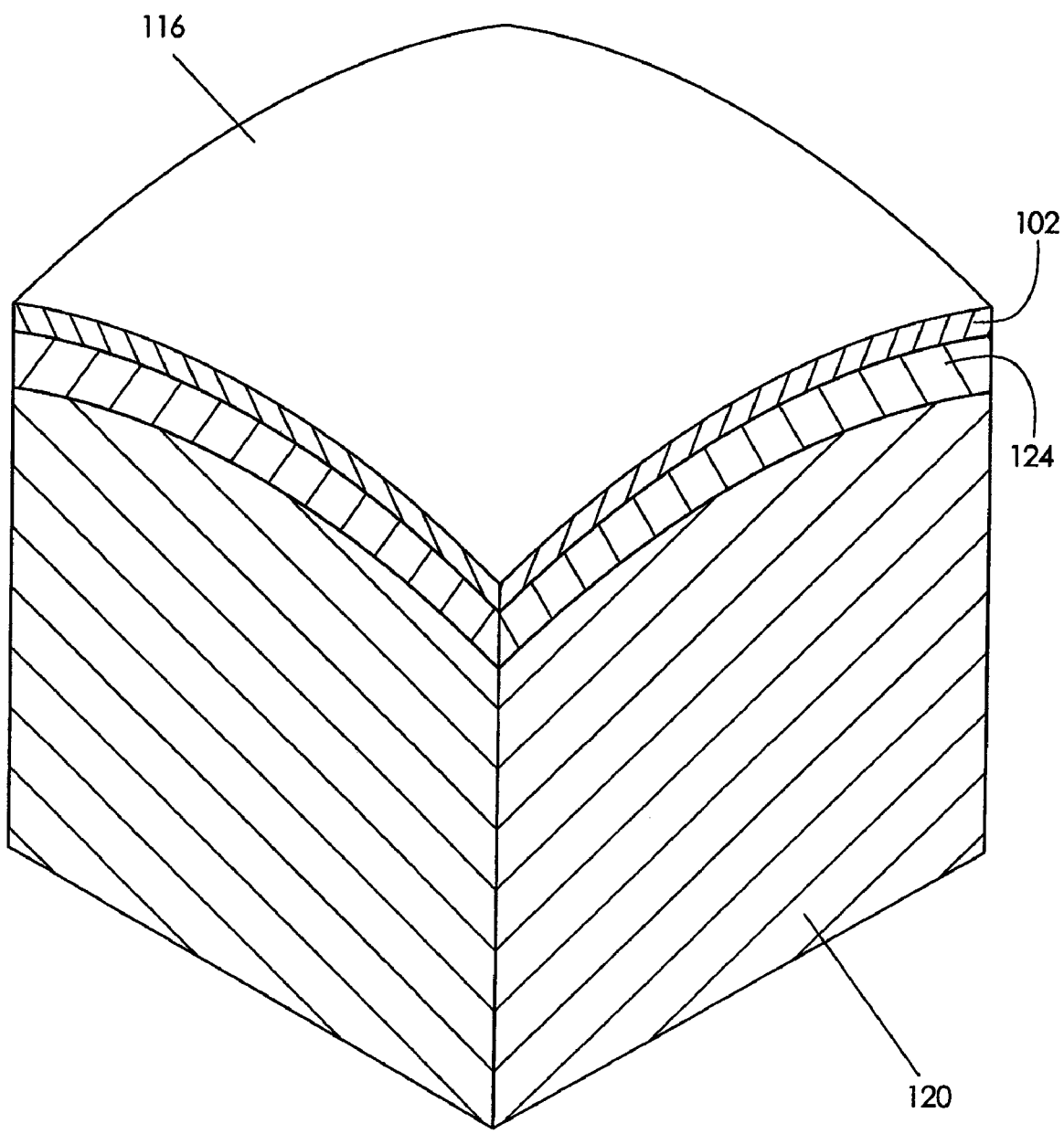
FIG. 9 illustrates one cell of a contiguous array with setting fluid.
Figure 10:
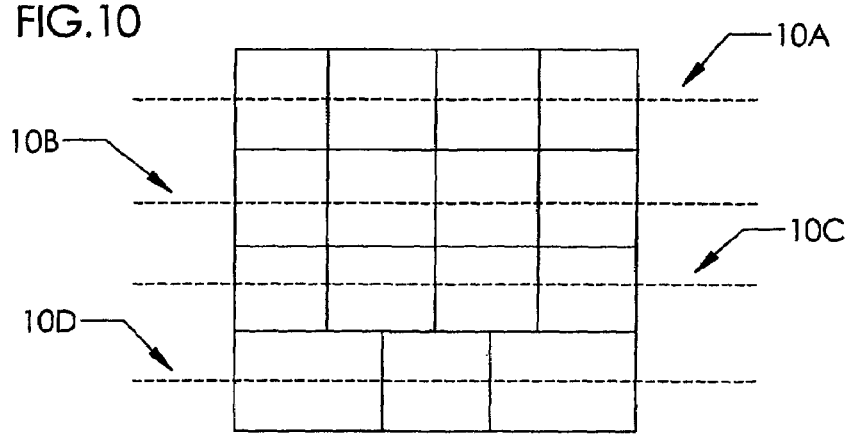
FIG. 10 illustrates various embodiments of the present invention, as further defined in various section views.
Figure 10A:
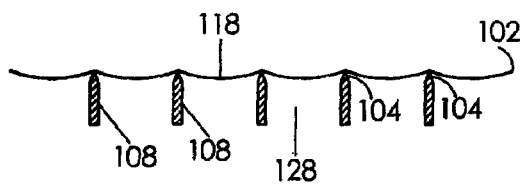
FIGS. 10A, 10B, 10C and 10D illustrate cross-sections of various embodiments of the present invention.

Therefore, the deformed pliable sheet 102, presents an array of concavities 118 as illustrated in FIG. 10A. The resultant deformation in the pliable sheet's 102 surface shape across the interior 110 between the cusped ledges 104 is a curved mirrorlette 100 shape. This mirrorlette shape consists of catenary and catenoid-like shapes. The optical quality of the pliable sheet's 102 surface is preserved via suspension across the cell's recessed interior 110 because the recess is deep enough to ensure that pliable sheet 102 makes no contact with the tooling anywhere except at the periphery where it is suspended by the cusped ledges 104. In a preferred embodiment, the edge thickness of each cusped ledge is between one and two ten thousandths of an inch. Accordingly, for a 1 mm by 1 mm mirrorlette 100, the edge imperfection is negligible. As seen in FIG. 9, while the sheet 102 is still on the tool 108, pouring or spraying a setting fluid 120 (solid filler) into the concavities 118 on the non-ledge side of sheet 102 fixates the shape of the deformed pliable sheet 102. Thereafter the fluid 120 adhesively sets with the pliable sheet 102 and fixates the mirrorlette 100 shapes.

Setting fluid solid filler materials 120 that have been shown to be particularly suitable to the present invention are substrate products which are used to make the substrate. The substrate material is that backing material which "locks" the deformed film 102 into shape. Substrate products are typically epoxies, foams, etc. The term "substrate material" is used to differentiate those materials from sheet 102. Sheet 102 may be a thin, aluminized film, a metallically-coated film (such as gold or silver metallized film), or a non-metallic reflective film such as that produced and sold by 3M Company. Preferred substrate materials may be obtained from Applied Poleramics, Incorporated, of Benicia, Calif. Preferred specific materials from Applied Poleramics are 266 epoxy and AU16 polyurethane, as well as EFM15 and EFM 18 phenolics. If necessary, a bonding layer 124 may be used to assist in joining the deformable sheet 102 with the solid filler material. If 266 epoxy is used as the substrate, and the aluminized polyester by Sigma Technologies is used, Loctite 770 available from Loctite Corporation, North American Group, Rocky Hill, Conn. 06067 is the preferred bonding layer. Loctite 770 is the preferred bonding layer for any sheet 102 that is used in conjunction with 266 epoxy.

The mirrorlette 100 has an optical-quality finish. The optical-quality finish side is may be provided with a coating 116, either before or after the pliable sheet 102 deformation process. Thus, if pliable sheet 102 is already suitably reflective, then no additional coating 116 is required. However, sheet 102 may be coated with a reflective material such as aluminum, silver or other material suitable to the spectral region for which the projection-receiving surface will be used. It is clear that pliable sheet 102 is made from at least two layers of material, a transparent layer and a reflective layer. On occasion, the transparent layer is joined to the reflective layer directly, without any additional surface preparation. On other occasions, the reflective layer must be chemically etched to permit the transparent layer to bond effectively. On other occasions, an intermediate bonding layers (not shown) is utilized to join the transparent layer with the reflective layer.

If desired, an additional transparent protective coating may be applied to the surface, above coating 116 (as particularly referenced in FIGS. 9 and 14A), to prevent environmental damage, such as, for example, a thin acrylic coating, or a polyethylene coating to prevent oxidation, abrasion or other surface degradation. Such coatings may be purchased from Peabody Laboratories, Inc. located at 1901 S. 54.sup.th Street, Philadelphia, Pa. 19143, and sold under the trade name PERMALAC. It is further preferred to start with a deformable sheet 102 already having a reflective surface opposite the tool 108, and a transparent surface facing the tool 108. Therefore, when the filler is applied, the reflective surface already has a protective coating from the original deformable sheet 102.

Because the pliable sheet 102 need not touch any part of the mirrorlette-shaping tool 108 except at very narrow cusped ledges 104, the detrimental effects of touching rough surfaces over the great majority of the mirrorlette area are avoided. In effect, the large majority of each mirrorlette 100 is formed in space.

The cusp 122 of the cell ledges 104 can be selected and adjusted in accord with characteristics of the pliable sheet 102 and the device 112 of fluidic force to obtain the desired figure of the final mirrorlette 100.

If the bottom of the recessed cell interior 110 is pre-shaped to a desired catenoid-like shape, then in the event the pliable sheet 102 does touch, the same catenoid-like advantage of the pliable sheet 102 will bridge most irregularities on that bottom similar in effect to suspension between the cusped ledges 104. As long as the ledges 104 are cusped to appropriate shape, the mirrorlettes can approach theoretical limits of optical finish and figure. The cusp 122 of the ledges 104 can be cut to any contour needed to produce a desired gain and angular dispersion.

Inexpensive films, as commercially available in large quantities, have optically smooth surface finishes and rigorous uniformity both in thickness and in mechanical character. These films and sheets are manufactured in tens of millions of square feet per year. They are used in applications for thermal control of satellites, and for use in thermal insulation. However, the majority of production of specularly reflective film is for food packaging, wrapping materials, balloons, window tint, eye pleasing displays, and other commercial applications wherein maintenance of exact shaping is either not an issue, or is provided (such as in the case of window tint) by application to a large substrate that fixates the shape. The preferred embodiment uses such readily available film for pliable sheet 102.

Additional embodiments are shown in FIGS. 10A through 10D. In each figure a cross-sectional view through the tool 108 is depicted with the pliable sheet 102 in contact with the cusped ledges 104.

Figure 10B:
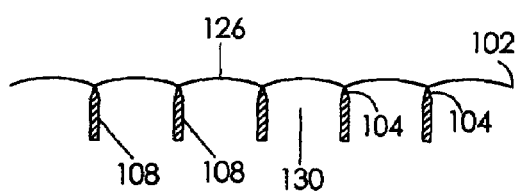

The presence of a bonding layer 124 can also allow the fluid force differential to be reversed to create an array of convexities 126, as shown in FIG. 10B, without the pliable sheet 102 detaching from the tool 108. These convexities 126 can be fixated, or not, depending upon the application. It can be understood that the deformed pliable sheet 102 can be fixated by any of several means to produce mirrorlettes 100 as shown in FIG. 6. Such means include filling surrounding areas with material, or stiffening via chemical, thermal, electrical, photo-polymerization, or other means. If left not fixated, the fluid force can be varied in time to produce a projection-receiving surface with gain varied in time accordingly.

The vacuum force 128 shown in the figures is actually the result of a net pressure force 130 due to the difference between inner and outer pressures on the two sides of the pliable sheet 102. The same effect can be produced by an increase in the outer pressure 128 using either pneumatic or hydraulic fluids. Additionally, for purposes of fabrication of fixed mirrorlette arrays 100, the sheet can be pinched between matching dyes, with fluid within the pinch, and still retain a sub-wavelength surface finish.

Figure 10C:
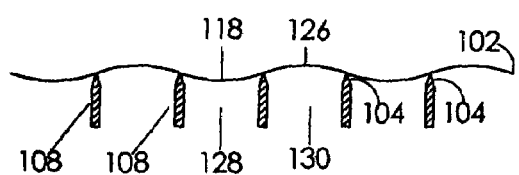
Figure 10D:
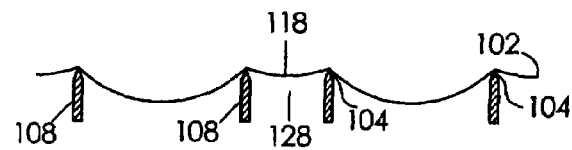
Figure 11A:
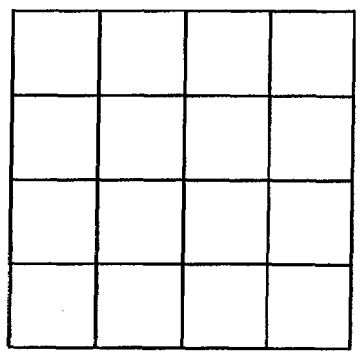
FIGS. 11A, 11B, 11C, 11D, 11E and 11F illustrate top and perspective views of various non-linear cell geometries.
Figure 11B:
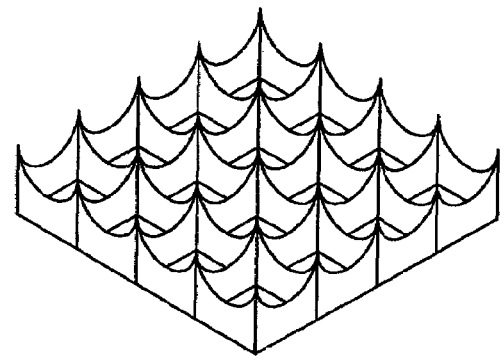
Figure 11C:
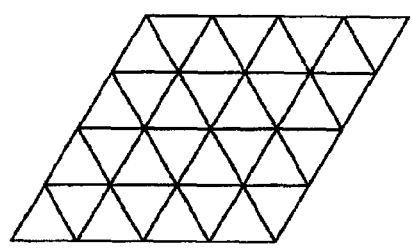
Figure 11D:
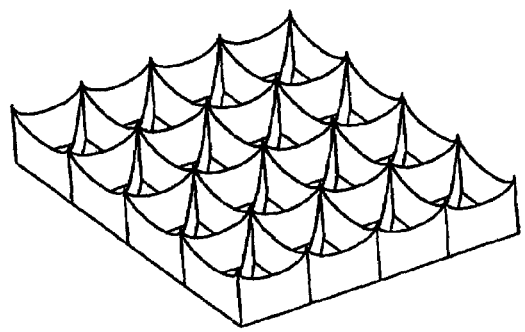
Figure 11E:
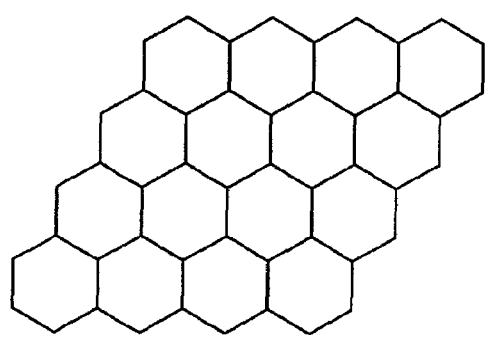
Figure 11F:
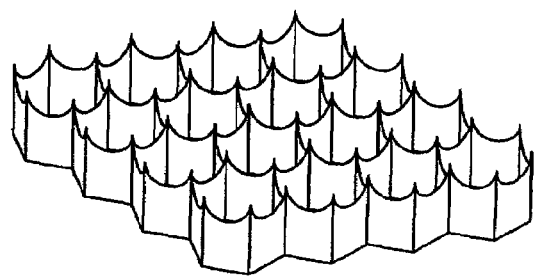
Figure 12A:
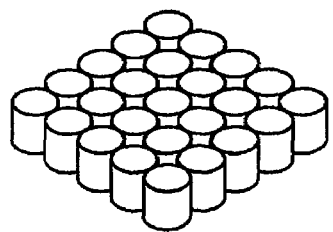
FIGS. 12A, 12B, 12C, 12D, 12E, 12F, 12G and 12H illustrate plan and perspective views of mixed cell geometries.
Figure 12B:
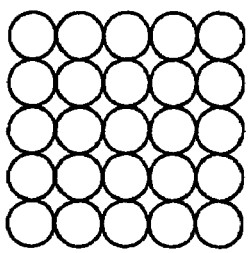
Figure 12C:
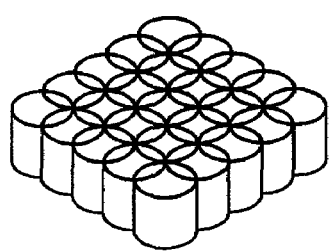
Figure 12D:
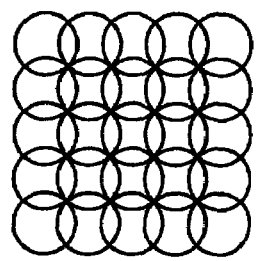
Figure 12E:
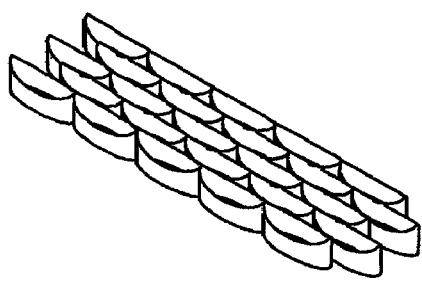
Figure 12F:
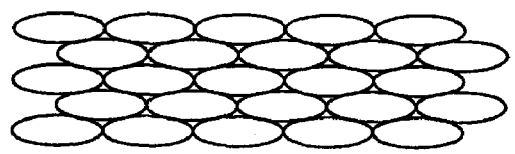
Figure 12G:
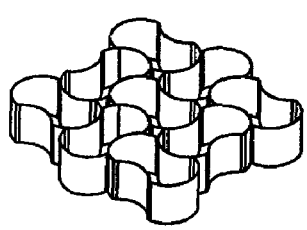
Figure 12H:
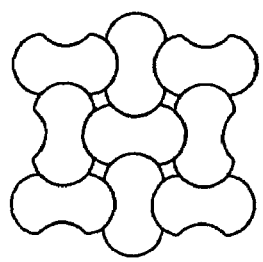
Figure 13A:
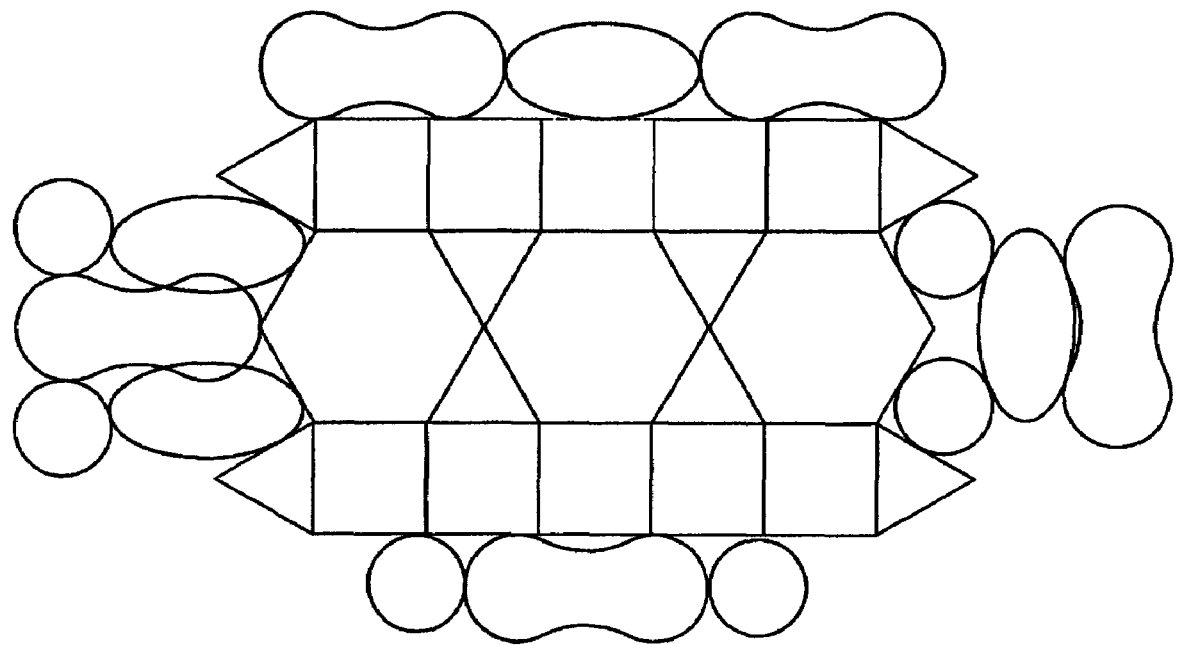
FIGS. 13A and 13B illustrate top plan and perspective views of mixed cell geometries, including non-linear cell geometries.
Figure 13B:
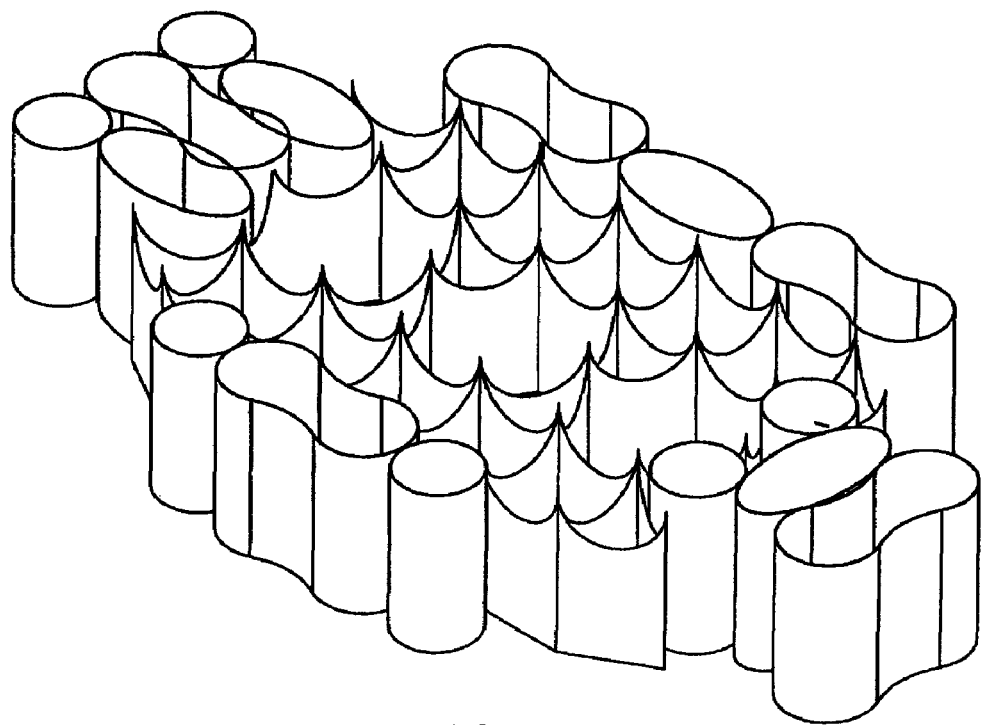

Referring now to FIG. 10C, it is shown that embodiments can incorporate mixes of pressure and vacuum in different cells of the tool 108 to obtain a mix of convexities 126 and concavities 118. The levels of vacuum 128 and pressure 130 can also be made to different levels in each individual cell 106, it not being necessary that neighboring cells 106 have the same geometry. This difference in geometry is clearly and also shown in FIG. 12A and FIG. 12B. This distribution of vacuum force 128 and pressure force 130 imparts a different gain to each cell 106 and facilitates a blend that can control cutoff rate 38. Further, FIG. 10D shows that the spacing between cusped ledges 104 need not be uniform. The shape of the cells 106 need not be the same everywhere, so long as the cells 106 are contiguous and cusped ledges 104 can be kept thin. FIG. 12A and FIG. 12B illustrate cells 106 that are contiguous, and of varying geometry, and yet having thin cusped ledges 104. In some embodiments the cells 106 may be of the same area and square, or of the same area and rectangular, or of the same area but mixed between square and rectangular, or of different sizes and any shape that keeps the cells contiguous. Squares (FIG. 11A, FIG. 11B), rectangles, triangles (FIG. 11C, FIG. 11D) and hexagons (FIGS. 11E, 11F) are examples of such alternative shapes; but other shapes are also amenable to contiguity and are included in these alternate embodiments of the present invention. Machining, casting, molding, or other practice in the material forming arts can readily make any of the associated tools for these additional embodiments.

As a result of the present invention, and in view of coating 116, it is pointed out that the projection-receiving surface can reflect wide spectrum resolved images of either infrared light or ultraviolet light. Thus, where a projector projects an image of either infrared light or ultraviolet light, the projection-receiving surface will reflect the infrared or ultraviolet image to the extent that such reflected image is a resolved, useful image. In contrast, if the same projector were to project an image of infrared light or ultraviolet light on a smooth aluminum surface, an image would be reflected, but would not be resolved.

Figure 14A:
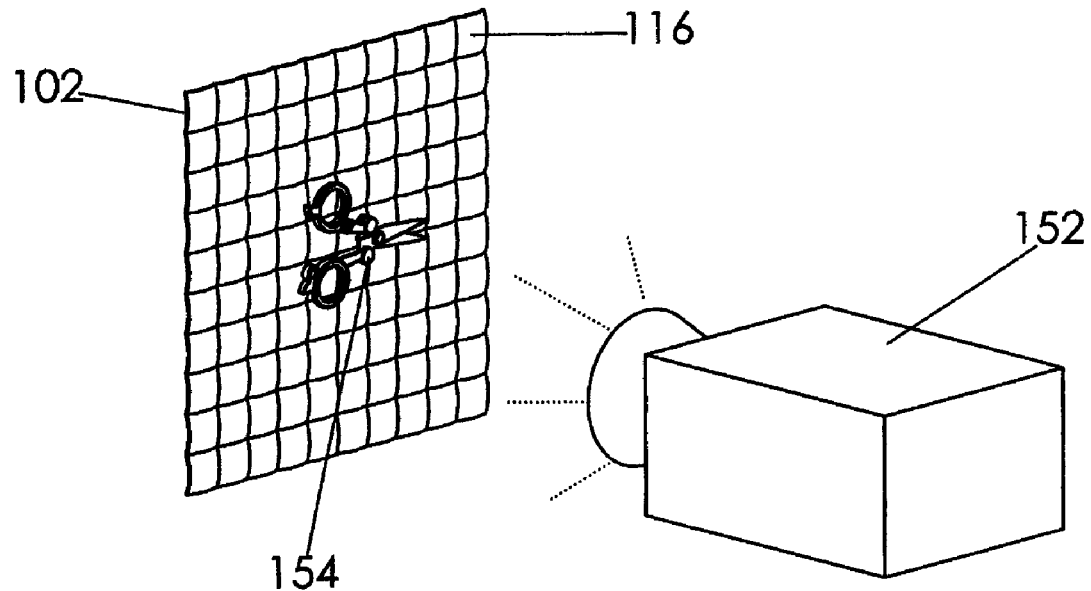
FIGS. 14A and 14B illustrate images projected onto the projection-receiving surface that can be viewed from different sides of a projector.
Figure 14B:
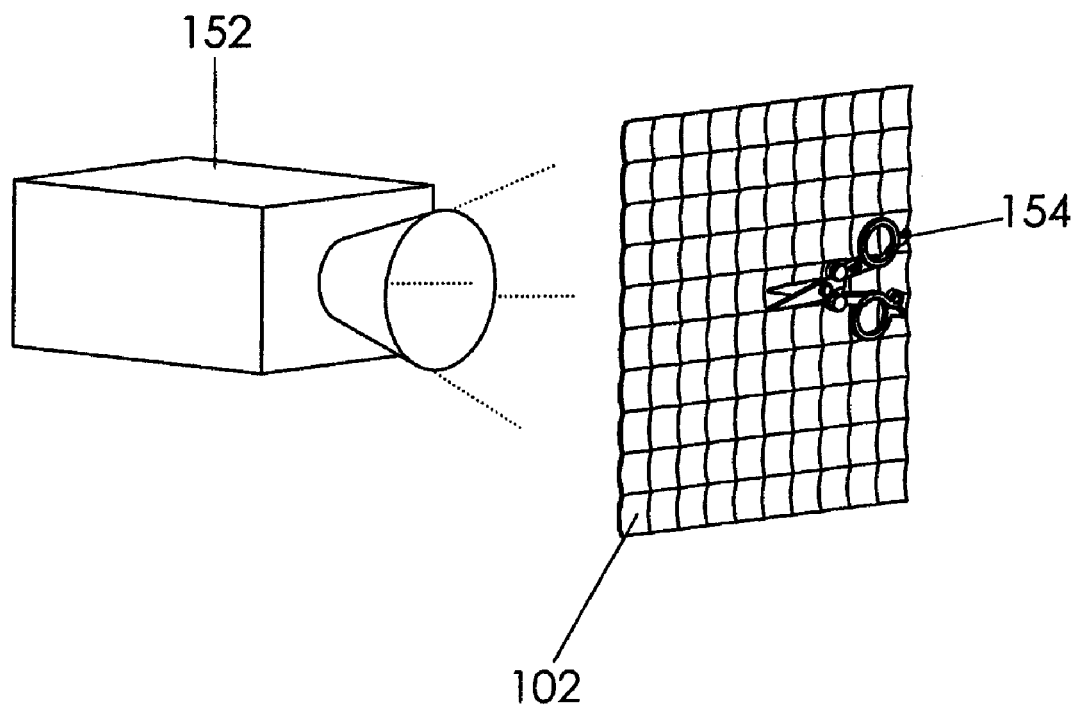

As shown in FIGS. 14A and 14B, images 154 projected onto the invention can be viewed from the same side as the projector 152 (front projection), from the side opposite the projector 152 (rear projection), or a combination of both. This is achieved as an element of the invention because the pliable sheet 102 that provides the finish can be coated with reflector material 116 of any selected reflectance value and the substrate 120 can be transparent to any selected degree. Therefore, the invention can produce a number of lenslets as well as a number of mirrorlettes. Further, in this manner a cell 150 can be a mirror, a lens, or lens and a mirror simultaneously.

As another aspect of the present invention, variable fields of view can be achieved if substrate materials 120 are omitted from use. In this embodiment, the pliable sheet 102 can be of an elastic material that will change shapes in direct accord with the amount of uniform urging force. As the force is increased or decreased, the curvature of sheet 102 in each cell will change accordingly. This allows the pliable sheet 102 to be placed across the tool 108 to produce projection-receiving surface whose gain can be constantly adjusted by changing the urging force. In other words, a variable field of view can be achieved.

With the following projection surface, a large number of product applications become possible. As a first example, if semi-transparent film is used (film that is at least partially light-transmissive), the film could function as a window to allow light to enter the room by permitting approximately ninety percent (90%) of the light through, but still have a high gain at ten percent (10%) reflectance. Such an application would permit a projection-receiving surface to function as a window in letting light through, but would also permit the projection of an image onto a projection-receiving surface with high contrast, permitting the image to be seen.

As a second example, the cells of the projection surface have edges that are geometrically imperfect, but negligible compared to the total area of the projection-receiving surface. As each cell has an approximate surface finish/roughness measurement of 0.1 micrometers, and a surface figure measurement of 0.001 rms of the cell width, volumes of viewing (which could be cone-shaped) are created following the laws of reflection. Because the volumes of viewing are precise due to projection-receiving surface precision, multi-image viewing is made possible. Multi-image viewing would for example permit the viewing of three separate movies on the same projection-receiving surface. Three movie projectors could separately project different movies on a projection-receiving surface, providing a separate movie to the watchers, depending upon where the viewer is sitting, the projection-receiving surface (including projection screens) may be utilized in an outdoor setting. The ability to operate under high background illumination, such as under direct solar illumination, depends upon maintaining high degrees of figure and finish with the projection-receiving surface's reflection cells. In the fabrication of catenoid-like-like cells, the influence of the edges from which the film is suspended depends upon various factors, including the thickness of the cell walls and the degree to which the cusp shapes are in accord with the catenoid-like profile. Accordingly, there is merit to having a small ratio between the surface area influenced by the cell edges and the overall surface area of the cells. The smaller the ratio, the less influence the edges will have upon the performance of the projection-receiving surface system, with the need for a small influence being particularly acute under bright background illumination. As such, the cusped ledge thickness may be selected in view of cell pattern and desired resolution to obtain an optimum projection-receiving surface. It also follows that area and edges of the mirrorlette cells are in generally constant curvature with a predetermined profile. The present invention facilitates ratios ranging from 1:100 and better. In a preferred embodiment, there are between 576 (which is 24 by 24) and 90,000 (which is 300 by 300) cells 106 per square foot in the pliable deformable sheet 102.

As a third example, the projection surface of the present invention maintains polarization. While three-dimensional movies are currently shown on a projection-receiving surface while providing the wearer with red/blue polarization glasses (horizontal polarization in one eye, vertical polarization in the other eye), the need for wearing such glasses is eliminated by the present projection surface.

As additional detail on this aspect, when polarized light reflects from a projection-receiving surface, the polarization of the light can be altered as a result of several physical mechanisms. Included in these are refraction in relatively smooth elements such as glass beads, and diffusion from rough elements such small particles used as pigments. To maintain polarization, there is advantage to using reflection mirrorlette 100 shapes whose figures are large compared to the wavelength of the reflected light, and whose design is for high gain, thereby restricting surface curvatures to modest angles. The present invention incorporates these desirable parameters and provides for preservation of polarization. The degree of preservation can be expressed in terms of the degree that 100% linearly polarized light will reflect from the projection-receiving surface with maintenance of the same polarization. For example, projection light having vertical polarization may return from a projection-receiving surface with only 50% of the light still vertically polarized, and the remaining 50% of the incident light having undergone rotation into the horizontal orientation. This would give a ratio of 50:50, which in effect is no maintenance of polarization at all. Another projection-receiving surface, such as that associated with the present invention, might reflect (return) 100% vertically polarized incident light with only 1% converted to horizontal polarization. In this case, the polarization maintenance ratio will be 99:1.

Projection-receiving surfaces with low polarization maintenance ratios are not suitable for multiple image applications such as 3D (three-dimensional) theater and display. With prior technology screens, a movie theater or an amusement park feature might present barely acceptable 3D viewing. Specifically, the contrast of imagery, the vividness of 3D effects, and the level of strain on the viewer are far from inviting, and may well underlie the infrequent commercial use of 3D. In fact, the polarization inadequacy of the vast majority of projection-receiving surfaces is such that theater 3D has needed the inferior technique of color-separated multiple imagery, which is barely acceptable and causes physiological strains. Even theaters equipped with better projection-receiving surfaces are only obtaining polarization ratios well below 4:1. The present invention provides ratios well in excess of 100:1, with a preferred ratio of 250:1, but capable of reaching 500:1 if desired, all without compromising the projected image's quality of chroma. Accordingly, the projection-receiving surface can be used for image separation via polarization or color.

In view of the foregoing, it will be seen that the several advantages of the invention are achieved and attained. First, whether the mirrorlette is concave and forms a real focal point in front of the projection-receiving surface or is convex and forms a virtual focal point behind the projection-receiving surface, the observer will see the same image and gain. The rejection of unwanted light will also be the same whether the mirrorlette is concave or convex. The present invention also provides a speckle metric of less than one in ten thousand.

Second, the present invention is an array in which the area and the edges of the mirrorlette cells are in constant curvature in a controllable profile. This negates the production of unwanted collective effects that generate glare and eliminates the need for statistical integration to prevent speckle.

Third, the present invention mixes mirrorlette curvatures and sizes that can be selected to generate a mix of angular dispersion profiles. The present invention produces an angular cut-off rate of 99% per degree at the viewing volume edge.

Fourth, the present invention can tune the angular cutoff rate from less than 1% to 99%, as needed for the audience and optical environment. A cutoff rate of 99% is valuable for multiple images on the same projection-receiving surface that are to be separated in accord with changes in viewing angle relative to the projection-receiving surface's normal. A rate of 10% or more is needed to obtain meaningfull power gain. The present invention can tune the horizontal and vertical angular cutoff rates separately, and can be tuned to an angular cut-off rate of between 10% and 99%.

Fifth, the present invention provides a production method wherein the sub-wavelength finish of the mirrorlette is everywhere of very high optical quality, curve 18 or better, such that the mirrorlette area does not scatter even the most intense light into any angle other than that defined by specular reflection. Accordingly, a projection-receiving surface designer can trade off the cell figure, the projection-receiving surface orientation, the projector position, and the viewer location such that unwanted environmental light is deflected out of the viewer volume. In the preferred embodiment, even direct sunlight can fall on the projection-receiving surface without overwhelming the dark areas of the image for an in-viewer-volume scattering ratio of less than 0.001 per steradian when tuned for operation in direct sunlight. For use in indirect sunlight (daylight) the present invention can achieve an in-viewer-volume scattering ratio of less than 0.01 per steradian. For use in room light the present invention can achieve an in-viewer-volume scattering ratio of less than 0.05 per steradian.

Sixth, the present invention achieves specular displacement of environmental light to non-viewer locations to not only preserve contrast, but also to preserve gray scale linearity. A gray-scale linearity metric greater than 0.5 in direct sunlight, greater than 0.75 under indirect sunlight, greater than 0.9 in subdued room light, and greater than 0.98 in a darkened theatre is achieved by the present invention.

Seventh, the present invention provides a method to control individual mirrorlette shapes, which allows the dispersion to be made different at different locations on the projection-receiving surface, thereby providing a means to balance brightness if need be; though the uniformity of mirrorlette figure across the projection-receiving surface will already be uniform and adjustment will not normally be needed. However, as with all very-high-gain projection-receiving surfaces, accommodation must be made for geometry. By the present invention, uniformity can actually be selected. A metric appropriate to quantification of uniformity is the root-mean-square (rms) variation of the projection-receiving surface's reproduction of brightness associated with a completely uniform illumination by a projector. The rms value for the metric should be determined at several sampling rates, and as a unit-less ratio of the absolute rms. As stated earlier, the present invention achieves a value of 0.001 rms of the cell width.

Eighth, the present invention employs specular rejection of strong ambient light to prevent the shift of image colors, both in hue and saturation. The present invention suffers desaturation well below 10%, and can achieve reproduction of color hue to within 5-degrees on the color wheel for a darkened environment and 15-degrees on the color wheel for a white-lighted room. Additionally, the present invention maintains color saturation in direct, off-axis sunlight to within 25%, and in darkened room light to within 2%.

Ninth, the present invention achieves an averaged modulation transfer function that is flat within 0.05 throughout the image space from zero spatial frequency up to a spatial frequency of one-inverse projection-receiving surface cell in a darkened room, and flat to 0.15 in a lighted room.

Tenth, the present invention produces an array of mirrorlettes spaced close enough together to avoid production of Moire patterns.

Eleventh, the present invention provides isolation between a cross-polarized projector and viewer filters, which isolation can be greater than 500:1. As ratio of light that remains polarized, to the light that is no longer polarized in a certain direction.

Twelfth, the present invention provides a broadband spectrally reflective projection-receiving surface in which the mirrorlette sizes can be set to accommodate longer wavelengths without diffraction. The projection-receiving surface of the present invention can be used into the long wavelengths of the far infrared as well as in the short wavelengths of the ultraviolet. Aluminum is one of the broadband coatings available to the present invention for surfacing the mirrorlettes. Such a coating supports reflection throughout the entire electromagnetic spectrum above 0.3 micrometers wavelength.

The projection-receiving surface may be used in a variety of environments including walls, ceiling, floors, automobile bodies, billboards, scoreboards, television screens, etc.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A projection-receiving surface, comprising:
   a single sheet formed into a plurality of catenoid-like mirrorlettes, said sheet having a first side and a second side; and
   a solid filler attached to one of said first side and said second side of said single sheet;
   wherein the projection-receiving surface has a polarization ratio of greater than 250:1.

2. The projection-receiving surface of claim 1, wherein the projection-receiving surface has at least 90,000 cells per square foot.

3. The projection-receiving surface of claim 1, wherein the projection-receiving surface has at least 576 cells per square foot.

4. The projection-receiving surface of claim 1, wherein the single sheet further comprises edges between the plurality of mirrorlettes and wherein the area and edges of the mirrorlettes are constant curvature in a predetermined profile.

5. The projection receiving surface of claim 1, wherein said single sheet comprises edge regions of generally uniform width between mirrorlettes, wherein the mirrolettes are separated from adjacent mirrorlettes by a generally uniform distance.

6. The projection-receiving surface of claim 5, wherein the surface area of all of said edge regions is about the same.

7. The projection-receiving surface of claim 5, wherein the surface area of at least one of said edge regions differs from the surface area of the remaining ones of said edge regions.

8. The projection-receiving surface of claim 5, wherein all of said mirrorlettes have the same geometry.

9. The projection-receiving surface of claim 5, wherein the geometry of at least one of said mirrorlettes differs from the geometry of the remaining ones of said mirrorlettes.

10. The projection receiving surface of claim 1, wherein said mirrorlettes are separated from one another by a plurality of cusped ledges.

11. The projection-receiving surface of claim 10, wherein all of said mirrorlettes have the same geometry.

12. The projection-receiving surface of claim 10, wherein the geometry of at least one of said mirrorlettes differs from the geometry of the remaining ones of said mirrorlettes.

13. The projection receiving surface of claim 1, wherein said mirrorlettes are contiguous and share a common concave geometry.

14. The projection receiving surface of claim 1, wherein said mirrorlettes are continuous and share a common convex geometry.

15. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has a polarization ratio of greater than 500:1.

16. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has an angular cut-off rate of 99% per degree at the viewing volume edge.

17. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has an angular cut-off rate between 10% and 99% per degree at the viewing volume edge.

18. The projection-receiving surface of claim 17, wherein the projection-receiving surface has a polarization ratio of greater than 100:1.

19. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has an in-viewer-volume scattering ratio ranging from between 0.05 steradian to 0.01 per steradian.

20. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has a gray-scale linearity metric ranging greater than 0.50 in direct sunlight.

21. A projection-receiving surface, comprising:
a single sheet formed into a plurality of catenoid-like mirrorlettes, said sheet having a first side and a second side; and
a solid filler attached to one of said first side and said second side of said single sheet; wherein the projection-receiving surface has a gray-scale linearity metric ranging greater than 0.75 in indirect sunlight.

22. A projection-receiving surface, comprising:
a single sheet formed into a plurality of catenoid-like mirrorlettes, said sheet having a first side and a second side; and
a solid filler attached to one of said first side and said second side of said single sheet; wherein the projection-receiving surface has a gray-scale linearity metric ranging greater than 0.9 in subdued room light.

23. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface has a gray-scale linearity metric ranging greater than 0.98 in a dark theatre.

24. A projection-receiving surface, comprising:
a single sheet formed into a plurality of catenoid-like mirrorlettes, said sheet having a first side and a second side; and
a solid filler attached to one of said first side and said second side of said single sheet; wherein the projection-receiving surface has desaturation below 10% in a darkened environment.

25. A projection-receiving surface, comprising:
a single sheet formed into a plurality of catenoid-like mirrorlettes, said sheet having a first side and a second side; and
a solid filler attached to one of said first side and said second side of said single sheet;
wherein the projection-receiving surface maintains color saturation in direct, off-axis sunlight to within 25%, and maintains color saturation in a darkened room to within 2%.

26. projection-receiving surface, comprising:
a,single skeet formed into a plurality of catenoid-like mirrorlettes, said sheet having a first side and a second side; and
a solid filler attached to one of said first side and said second side of said single sheet;
wherein the projection-receiving surface achieves an averaged modulation transfer function that is relatively flat within 0.05 throughout the image space from zero spatial frequency up to a spatial frequency of one-inverse screen cell in a darkened room, and flat to 0.15 in a lighted room.

* * * * *

UNITED STATES PATENT AND TRADEMARK OFFICE
CERTIFICATE OF CORRECTION

PATENT NO. : 7,548,369 B2
APPLICATION NO. : 11/740059
DATED : June 16, 2009
INVENTOR(S) : Peter D. Poulsen It is certified that error appears in the above-identified patent and that said Letters Patent is hereby corrected as shown below:

Column 2, Line 61: replace "for obtaining quality mages in strong ambient light." with -- for obtaining quality images in strong ambient light. --.

Column 13, Lines 1-2: replace "The spectral range cannot be greater the spectrum transmitted" with -- The spectral range cannot be greater than the spectrum transmitted --.

Column 13, Line 10: replace "thermal infrared screens, as in desirable" with -- thermal infrared screens, as is desirable --.

Column 20, Lines 46-47: replace "The optical-quality finish side is may be provided with a coating" with -- The optical-quality finish side may be provided with a coating --.

Column 21, Lines 1-2: replace "Peabody Laboratories, Inc. located at 1901 S. 54.sup.th Street" with -- Peacock Laboratories, Inc. located at 1901 S. 54th Street --.

Column 23, Line 26: replace "In the fabrication of catenoid-like-like cells, in the influence of" with -- In the fabrication of catenoid-like cells, in the influence of --.

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,548,369 B2 | |
| APPLICATION NO. | : 11/740059 | |
| DATED | : June 16, 2009 | |
| INVENTOR(S) | : Peter D. Poulsen | |

It is certified that error appears in the above-identified patent and that said Letters Patent is hereby corrected as shown below:

Column 2, Line 61: replace "for obtaining quality mages in strong ambient light." with -- for obtaining quality images in strong ambient light. --.

Column 13, Lines 1-2: replace "The spectral range cannot be greater the spectrum transmitted" with -- The spectral range cannot be greater than the spectrum transmitted --.

Column 13, Line 10: replace "thermal infrared screens, as in desirable" with -- thermal infrared screens, as is desirable --.

Column 20, Lines 46-47: replace "The optical-quality finish side is may be provided with a coating" with -- The optical-quality finish side may be provided with a coating --.

Column 21, Lines 1-2: replace "Peabody Laboratories, Inc. located at 1901 S. 54.sup.th Street" with -- Peacock Laboratories, Inc. located at 1901 S. 54th Street --.

Column 23, Line 26: replace "In the fabrication of catenoid-like-like cells, in the influence of" with -- In the fabrication of catenoid-like cells, in the influence of --.

In the Claims:

Claim 5 (Column 26, Line 40): replace "wherein the mirrolettes are" with -- wherein the mirrorlettes are --.

Claim 14 (Column 26, Line 65): replace "said mirrorlettes are continous and share a common" with -- said mirrorlettes are contiguous and share a common --.

Claim 19 (Column 27, Lines 37-38): replace "ranging from between 0.05 steradian to 0.01 per steradian." with -- ranging from between 0.05 per steradian to 0.01 per steradian. --.

UNITED STATES PATENT AND TRADEMARK OFFICE
CERTIFICATE OF CORRECTION

PATENT NO. : 7,548,369 B2
APPLICATION NO. : 11/740059
DATED : June 16, 2009
INVENTOR(S) : Peter D. Poulsen It is certified that error appears in the above-identified patent and that said Letters Patent is hereby corrected as shown below:

Claim 26 (Column 28, Line 41): replace "a,single, skeet formed into a plurality of catenoid-like" with -- a single sheet formed into a plurality of catenoid-like --.

This certificate supersedes the Certificate of Correction issued September 15, 2009.

Signed and Sealed this

Twenty-fourth Day of November, 2009

David J. Kappos
*Director of the United States Patent and Trademark Office*